United States Patent
Dhillon et al.

(10) Patent No.: US 10,735,904 B2
(45) Date of Patent: Aug. 4, 2020

(54) SYSTEM AND METHOD FOR MONITORING LOCATION AND ACTIVITY OF DEVICES

(71) Applicant: Aeris Communications, Inc., San Jose, CA (US)

(72) Inventors: Gurinder Singh Dhillon, Sunnyvale, CA (US); Ryan David Kennedy, Naperville, IL (US)

(73) Assignee: Aeris Communications, Inc., San Jose, CA (US)

( * ) Notice: Subject to any disclaimer, the term of this patent is extended or adjusted under 35 U.S.C. 154(b) by 0 days.

(21) Appl. No.: 16/014,159

(22) Filed: Jun. 21, 2018

(65) Prior Publication Data
US 2018/0376290 A1    Dec. 27, 2018

Related U.S. Application Data

(60) Provisional application No. 62/523,749, filed on Jun. 22, 2017.

(51) Int. Cl.
*H04W 4/029* (2018.01)
*H04W 4/021* (2018.01)
(Continued)

(52) U.S. Cl.
CPC .......... *H04W 4/029* (2018.02); *G01C 21/343* (2013.01); *G06Q 10/063114* (2013.01);
(Continued)

(58) Field of Classification Search
CPC ....... H04W 4/029; H04W 4/44; H04W 4/023; H04W 4/021; H04W 4/70; G07C 5/008;
(Continued)

(56) References Cited

U.S. PATENT DOCUMENTS 6,239,707 B1    5/2001    Park
6,496,775 B2    12/2002    McDonald, Jr.
(Continued)

FOREIGN PATENT DOCUMENTS

CN    104835029    8/2015
WO    2014106299    7/2014
(Continued)

OTHER PUBLICATIONS

International Search Report and Written Opinion from International Application No. PCT/US16/46923 dated Oct. 27, 2016.
(Continued)

*Primary Examiner* — Brandon J Miller
(74) *Attorney, Agent, or Firm* — Brundidge & Stanger, P.C.

(57) ABSTRACT

In one example embodiment, a computer-implemented method and system for providing job status information for an IoT device are disclosed. The method providing job status information for an IoT device includes receiving location information of the IoT device; receiving job assignment information for the IoT device; and evaluating the location information to determine the job status for the IoT device based on a specified condition. The system for providing job status information for an IoT devices includes at least one IoT device, a data processing system and a user interface, wherein the data processing system further comprises a storage database, wherein the storage database receives location information of the IoT device and job assignment information for the IoT device; an analytics engine, wherein the analytics engine evaluates the location information to determine the job status for the IoT device based on a specified condition.

18 Claims, 17 Drawing Sheets

(51) Int. Cl.
  *H04W 4/02* (2018.01)
  *G01C 21/34* (2006.01)
  *G06Q 10/06* (2012.01)
  *G07C 5/00* (2006.01)
  *H04W 4/44* (2018.01)
  *H04W 4/70* (2018.01)
  *H04L 29/08* (2006.01)

(52) U.S. Cl.
  CPC ............ *G07C 5/008* (2013.01); *H04W 4/021* (2013.01); *H04W 4/023* (2013.01); *H04W 4/44* (2018.02); *H04W 4/70* (2018.02); *H04L 67/12* (2013.01)

(58) Field of Classification Search
  CPC .......... G06Q 10/063114; G01C 21/343; H04L 67/12
  See application file for complete search history.

(56) References Cited

U.S. PATENT DOCUMENTS

| | | | |
|---|---|---|---|
| 6,651,001 B2 | 11/2003 | Apsell | |
| 6,687,356 B1 | 2/2004 | Glitho | |
| 6,931,309 B2 | 8/2005 | Phelan | |
| 7,213,048 B1 | 5/2007 | Parupudi | |
| 7,246,009 B2 | 7/2007 | Hamblen | |
| 7,801,538 B2 | 9/2010 | Weiser | |
| 7,848,765 B2 | 12/2010 | Phillips | |
| 8,000,726 B2 | 8/2011 | Altman | |
| 8,018,329 B2 | 9/2011 | Morgan | |
| 8,135,505 B2 | 3/2012 | Vengroff | |
| 8,346,230 B2 | 1/2013 | Goodman | |
| 8,473,148 B2 | 6/2013 | Nielsen | |
| 8,510,200 B2 | 8/2013 | Pearlman | |
| 8,566,014 B1 | 10/2013 | Kozolchyk | |
| 8,589,330 B2 | 11/2013 | Petersen | |
| 8,593,277 B2 | 11/2013 | Nath | |
| 8,595,696 B2 | 11/2013 | Maximilien et al. | |
| 8,630,768 B2 | 1/2014 | McClellan | |
| 8,667,456 B1 | 3/2014 | Czymontek | |
| 8,725,569 B2 | 5/2014 | Liang | |
| 8,755,824 B1 | 6/2014 | Wang | |
| 8,756,010 B2 | 6/2014 | Gupta | |
| 8,869,038 B2 | 10/2014 | Eick | |
| 8,909,256 B2 | 12/2014 | Fraccaroli | |
| 8,913,983 B2 | 12/2014 | Lorello | |
| 8,949,022 B1 | 2/2015 | Fahrner | |
| 8,971,930 B2 | 3/2015 | Li | |
| 9,014,888 B2 | 4/2015 | Sukkarié | |
| 9,043,222 B1 | 5/2015 | Kerr | |
| 9,076,009 B2 | 7/2015 | Sathish | |
| 9,076,165 B2 | 7/2015 | Busch | |
| 9,104,738 B2 | 8/2015 | Kay et al. | |
| 9,119,038 B2 | 8/2015 | Woods | |
| 9,122,693 B2 | 9/2015 | Blom | |
| 9,140,567 B2 | 9/2015 | Fryer | |
| 9,141,266 B2 | 9/2015 | McCormick | |
| 9,146,721 B1 | 9/2015 | Nagaraja | |
| 9,210,534 B1* | 12/2015 | Matthieu | ................ H04L 29/06 |
| 9,225,519 B1 | 12/2015 | Fraccaroli | |
| 9,250,887 B2 | 2/2016 | Lucovsky | |
| 9,275,114 B2 | 3/2016 | Milton | |
| 9,277,362 B2 | 3/2016 | Li | |
| 9,349,128 B1 | 5/2016 | Kerr | |
| 9,424,751 B2 | 8/2016 | Hodges | |
| 9,507,346 B1 | 11/2016 | Levinson | |
| 9,576,295 B2 | 2/2017 | Volpe | |
| 9,615,202 B2 | 4/2017 | Dal Santo | |
| 9,661,470 B1 | 5/2017 | Du Bois | |
| 9,712,486 B2 | 7/2017 | Johnson | |
| 9,712,972 B2 | 7/2017 | Lynch | |
| 9,741,191 B1 | 8/2017 | Wong | |
| 9,774,994 B2 | 9/2017 | Chen | |
| 9,792,567 B2 | 10/2017 | Khasis | |
| 9,805,521 B1 | 10/2017 | Davidson | |
| 9,817,948 B2 | 11/2017 | Swank | |
| 9,826,345 B2 | 11/2017 | Haro | |
| 9,838,843 B1 | 12/2017 | Bajaj | |
| 9,871,865 B2 | 1/2018 | Shaashua | |
| 9,878,663 B1 | 1/2018 | Kochura | |
| 9,988,058 B2 | 6/2018 | Phillips | |
| 10,037,668 B1 | 7/2018 | DesGarennes et al. | |
| 10,097,960 B2 | 10/2018 | Tung | |
| 10,231,084 B2 | 3/2019 | Bagchi | |
| 2004/0111195 A1 | 6/2004 | Vries | |
| 2004/0193617 A1 | 9/2004 | Adler | |
| 2005/0090978 A1 | 4/2005 | Bathory | |
| 2005/0096009 A1 | 5/2005 | Ackley | |
| 2005/0156715 A1 | 7/2005 | Zou | |
| 2006/0248121 A1 | 11/2006 | Cacenco et al. | |
| 2007/0143013 A1 | 6/2007 | Breen | |
| 2007/0173991 A1 | 7/2007 | Tenzer | |
| 2008/0033791 A1* | 2/2008 | Jones | ..................... G06Q 10/06 705/7.37 |
| 2008/0125965 A1 | 5/2008 | Carani | |
| 2008/0319602 A1 | 12/2008 | McClellan | |
| 2009/0009321 A1 | 1/2009 | McClellan | |
| 2009/0079555 A1 | 3/2009 | Aguirre De Carcer | |
| 2009/0248883 A1 | 10/2009 | Suryanarayana | |
| 2009/0019357 A1 | 11/2009 | Cudich | |
| 2009/0275348 A1 | 11/2009 | Weinreich | |
| 2009/0309789 A1 | 12/2009 | Verechtchiagine | |
| 2009/0326991 A1 | 12/2009 | Wei | |
| 2010/0075648 A1 | 3/2010 | Matsuoka et al. | |
| 2010/0094500 A1 | 4/2010 | Jin | |
| 2010/0106603 A1 | 4/2010 | Dey | |
| 2010/0203901 A1 | 8/2010 | Dinoff | |
| 2010/0214068 A1 | 8/2010 | Nadkarni | |
| 2010/0280734 A1 | 11/2010 | Brinton | |
| 2010/0289644 A1 | 11/2010 | Slavin | |
| 2010/0306735 A1 | 12/2010 | Hoff et al. | |
| 2011/0112768 A1 | 5/2011 | Doyle | |
| 2011/0126168 A1 | 5/2011 | Ilyayev | |
| 2011/0178811 A1 | 7/2011 | Sheridan | |
| 2011/0202591 A1 | 8/2011 | Reis | |
| 2011/0238457 A1 | 9/2011 | Mason | |
| 2012/0058764 A1 | 3/2012 | Kang | |
| 2012/0260228 A1 | 10/2012 | Mallick | |
| 2012/0330722 A1 | 12/2012 | Volpe et al. | |
| 2013/0031029 A1 | 1/2013 | Davidson | |
| 2013/0055253 A1 | 2/2013 | Jubran | |
| 2013/0066688 A1 | 3/2013 | Pinkus | |
| 2013/0090106 A1 | 4/2013 | Mathews | |
| 2013/0093603 A1 | 4/2013 | Tschirhart | |
| 2013/0103307 A1 | 4/2013 | Sartipi | |
| 2013/0141249 A1 | 6/2013 | Pearlman et al. | |
| 2013/0190967 A1 | 7/2013 | Hassib | |
| 2013/0212130 A1 | 8/2013 | Rahnama | |
| 2013/0245680 A1 | 9/2013 | McQuade | |
| 2013/0254755 A1 | 9/2013 | Yousouf | |
| 2013/0267253 A1 | 10/2013 | Case | |
| 2013/0289819 A1 | 10/2013 | Hassib | |
| 2013/0289873 A1 | 10/2013 | Mitchell | |
| 2013/0297803 A1 | 11/2013 | Hate | |
| 2013/0304347 A1 | 11/2013 | Davidson | |
| 2013/0340305 A1 | 12/2013 | Mobley | |
| 2013/0346336 A1 | 12/2013 | Murphy | |
| 2014/0026113 A1 | 1/2014 | Farooqi | |
| 2014/0031073 A1 | 1/2014 | Davis | |
| 2014/0057648 A1 | 2/2014 | Lyman | |
| 2014/0059695 A1 | 2/2014 | Parecki | |
| 2014/0062695 A1 | 3/2014 | Rosen | |
| 2014/0095214 A1 | 4/2014 | Mathe et al. | |
| 2014/0155094 A1 | 6/2014 | Zises | |
| 2014/0172294 A1 | 6/2014 | Karla | |
| 2014/0215043 A1 | 7/2014 | Ryu et al. | |
| 2014/0226470 A1 | 8/2014 | Kim | |
| 2014/0274115 A1 | 9/2014 | Michalson | |
| 2014/0274136 A1 | 9/2014 | Edge | |
| 2014/0282380 A1 | 9/2014 | Abrahams | |
| 2014/0325048 A1 | 10/2014 | Benchorin | |
| 2014/0325394 A1 | 10/2014 | Hamill | |
| 2014/0351411 A1 | 11/2014 | Woods | |

(56) References Cited

U.S. PATENT DOCUMENTS

| | | | |
|---|---|---|---|
| 2014/0359552 A1 | 12/2014 | Misra | |
| 2014/0370911 A1 | 12/2014 | Gorgenyi | |
| 2014/0380264 A1 | 12/2014 | Misra et al. | |
| 2015/0012908 A1 | 1/2015 | Farooqi | |
| 2015/0095355 A1 | 4/2015 | Patton | |
| 2015/0106206 A1 | 4/2015 | Vengroff | |
| 2015/0135163 A1 | 5/2015 | Mun | |
| 2015/0149980 A1 | 5/2015 | Zhong | |
| 2015/0163626 A1 | 6/2015 | Zimmer | |
| 2015/0163630 A1 | 6/2015 | Hughes | |
| 2015/0173037 A1 | 6/2015 | Pijl | |
| 2015/0180746 A1 | 6/2015 | Day, II | |
| 2015/0181016 A1 | 6/2015 | Jain | |
| 2015/0245189 A1 | 8/2015 | Nalluri | |
| 2015/0264527 A1 | 9/2015 | Wang | |
| 2015/0271033 A1 | 9/2015 | Srivastava et al. | |
| 2015/0278759 A1 | 10/2015 | Harris | |
| 2015/0304175 A1 | 10/2015 | Maes | |
| 2015/0350843 A1 | 12/2015 | Jensen et al. | |
| 2016/0003627 A1 | 1/2016 | Bonhomme | |
| 2016/0041833 A1 | 2/2016 | Standley et al. | |
| 2016/0042303 A1 | 2/2016 | Medina | |
| 2016/0050536 A1 | 2/2016 | You | |
| 2016/0057209 A1 | 2/2016 | Parikh | |
| 2016/0066141 A1 | 3/2016 | Jain | |
| 2016/0071333 A1 | 3/2016 | Haidar | |
| 2016/0073229 A1 | 3/2016 | Haro | |
| 2016/0083697 A1 | 3/2016 | Phillips | |
| 2016/0103657 A1 | 4/2016 | Zhang et al. | |
| 2016/0116596 A1 | 4/2016 | Rajala | |
| 2016/0124742 A1 | 5/2016 | Rangasamy | |
| 2016/0150021 A1* | 5/2016 | Britt | H04W 4/70 709/219 |
| 2016/0173404 A1 | 6/2016 | Pouyllau | |
| 2016/0203651 A1 | 7/2016 | Heath | |
| 2016/0247330 A1 | 8/2016 | Rork | |
| 2016/0284184 A1 | 9/2016 | Bean et al. | |
| 2016/0286355 A1 | 9/2016 | Shur | |
| 2016/0357522 A1 | 12/2016 | Wee | |
| 2016/0371553 A1 | 12/2016 | Farnham, IV | |
| 2017/0006135 A1 | 1/2017 | Siebel | |
| 2017/0006419 A1 | 1/2017 | Rajala | |
| 2017/0006430 A1 | 1/2017 | Chao | |
| 2017/0171204 A1 | 6/2017 | Forood | |
| 2017/0203633 A1* | 7/2017 | High | B60H 1/00735 |
| 2017/0244841 A1 | 8/2017 | Costandi | |
| 2017/0270792 A1* | 9/2017 | Breton | G08G 1/0965 |
| 2017/0349058 A1 | 12/2017 | Bernier | |
| 2017/0359237 A1* | 12/2017 | Hao | H04L 67/02 |
| 2017/0366933 A1 | 12/2017 | Chen | |
| 2018/0005522 A1* | 1/2018 | Pogula | G08G 1/087 |
| 2018/0049001 A1 | 2/2018 | Volozh | |
| 2018/0199239 A1 | 7/2018 | Sabater | |
| 2018/0255428 A1 | 9/2018 | Bagchi | |
| 2018/0302476 A1* | 10/2018 | Perez | H04L 67/32 |
| 2018/0365785 A1* | 12/2018 | Boss | G06Q 50/265 |
| 2018/0372503 A1 | 12/2018 | Bagchi | |
| 2019/0266518 A1 | 8/2019 | Medina | |
| 2019/0285426 A1* | 9/2019 | Mitchell | G06F 16/29 |

FOREIGN PATENT DOCUMENTS

| | | |
|---|---|---|
| WO | 2015143416 | 9/2015 |
| WO | 2016025495 | 2/2016 |

OTHER PUBLICATIONS

Brouwers et al., Dwelling in the canyons: Dwelling detection in Urban Environments Using GPS, Wi-Fi, and Geolocation, Dec. 14, 2011.

Boukhechba et al.,Hybrid battery-friendly mobile solution for extracting users' visited places, Dec. 31, 2016.

Perera et al., Energy Efficient Location and Activity-aware On-Demand Mobile Distributed Sensing Platform for Sensing as a Service in IoT Clouds, http://arxiv.org/abs/1601.00428, Apr. 1, 2016.

Merlino et al., Mobile crowdsensing as a service: A platform for applications on top of sensing Clouds, http://www.sciencedirect.com/science/article/pii/S0167739X15002976, Mar. 2016.

International Search Report and Written Opinion from International Application No. PCT/US16/46924 dated Oct. 28, 2016.

Wikipedia, "Virtual Machine," 2014, pp. 1-9, downloaded from the Wayback Machine Internet Archive at ,<url>:https://web.archive.org/web/20140402003043/https://en.wikipedia.org/wikiVirtual_machine.

Wikipedia, "Virtual Machine," 2013, pp. 1-11, downloaded from the Wayback Machine Internet Archive at <url>:https://web.archive.org/web/20130402165412/https://en.wikipedia.org/wiki/Wireless_sensor_network.

"GeoFencing & Alerts", myGeoTracking, Abaqus Inc., Jul. 11, 2016, 1 page, Retrieved from: http://www.mygeotracking.com/solutions/pdf/geo_fencing_alerts.pdf.

Almomani et al., "Ubiquitous GPS vehicle tracking and management system", In Applied Electrical Engineering and Computing Technologies (AEECT), Dec. 31, 2011, IEEE Jordan Conference on, pp. 1-6.

Dennis Mbuvi, "Airtel Provide Connectivity to 2nk Sacco's Frotcom Fleet Management System", Airtel , Africa News Service, Feb. 2013.

Gerla et al., "Internet of vehicles: From intelligent grid to autonomous cars and vehicular clouds", In Internet of Things (Wf-IoT), 2014 IEEE World Forum on, pp. 241-246, Dec. 31, 2014.

Rusu et al., "Localization in large-scale underground environments with RFID", 24th Canadian Conference on Electrical and Computer Engineering (CCECE), May 31, 2011.

Jin et al., "An information framework for creating a smart city through internet of things", IEEE Internet of Things Journal, 1(2), pp. 112-121, Dec. 31, 2014.

Gantait et al., Use vehicle sensor data to execute smart transactions in Blockchain, IBM, Jun. 5, 2017., Retrieved from Internet: https://www.ibm.com/developerworks/cloud/library/cl-blockchain-for-cognitive-iot-apps2/.

Adelabu, Design and Construction of a Vehicle Tracking and Accident Alert System Using GPS and GSM Module, Nov. 30, 2017., Retrieved from the Internet: http://repository.fuoye.edu.ng/bitstream/123456789/1441/1/DESIGN%20AND%20CONSTRUCTION%20%20OF%20A%20VEHICLE%20TRACKING%20AND%20ACCIDENT%20ALERT%20SYSTEM%20%20USING%20%20GPS%20%20AND%20GSM%20MODULE.pdf. (C) Nov. 2017.

AT&T, Fleet management and tracking, Feb. 26, 2018., Retrieved from the Internet: https://www.business.att.com/solutions/Service/internet-of-things/vehicle-solutions/iot-connected-fleet/. (C)2018. Earliest publication date via Wayback archive:http://web.archive.org/web/20180226093503/https://www.business.att.com/solutions/Service/internet-of-things/vehicle-solutions/iot-connected-fleet/.

Frey, IoT ushers in a new era for supply chain fulfillment, Oct. 25, 2017, Retrieved from the Internet: https://Internetofthingsagenda.techtarget.com/blog/IoT-Agenda/IoT-ushers-in-a-new-era-for-supply-chain-fulfillment.

International Search Report and Written Opinion from International Application No. PCTUS1838825 dated Sep. 18, 2018.

Wei-Tek Tsai et al., "Service-Oriented Cloud Computing Architecture," 2010 [retrieved on May 9, 2019], Seventh International Conference on Information Technology: New Generations, pp. 684-689, downloaded from: https://ieeexplore.ieee.org/. 2010.

B Loganayagi et al., "Creating Virtual Platform for Cloud Computing," 2010 [retrieved on May 9, 2019], 2010 IEEE International Conference on Computational Intelligence and Computing Research, pp. 1-4, downloaded from: https://ieeexplore.ieee.org 2010.

Radha Guha et al, "Impact of Web 2.0 and Cloud Computing Platform on Software Engineering," 2011 [retrieved on May 9, 2019], International Symposium on Electronic System Design, pp. 213-218, downloaded from:https//ieeexplore.ieee.org 2011.

* cited by examiner

200

Live Tracking: Live Tracking provides a convenient way to view high level and detailed information about vehicles and places. It also provides interactions, e.g. clicking on a vehicle will expose additional details about that vehicle or by clicking on a circle expose additional details about the vehicles at the location represented by that circle.
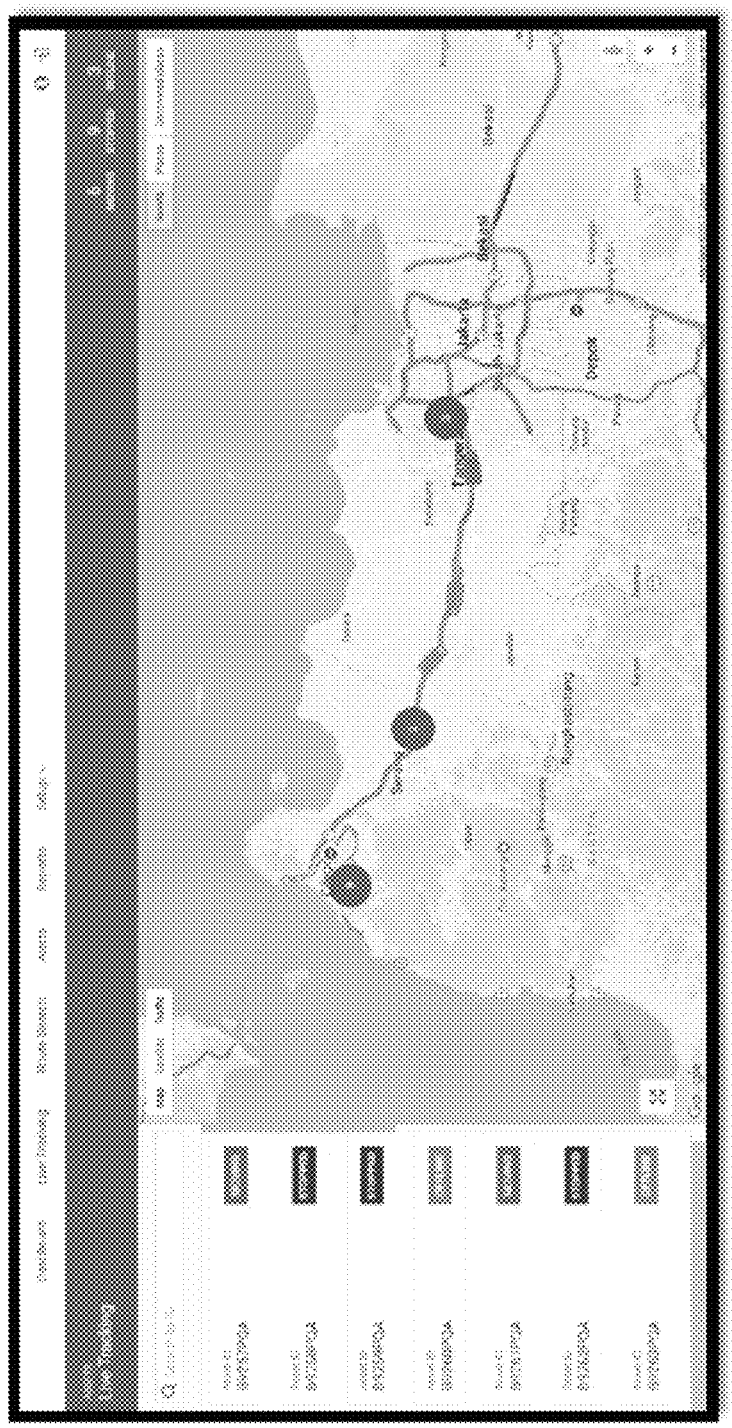
400   FIG. 4A

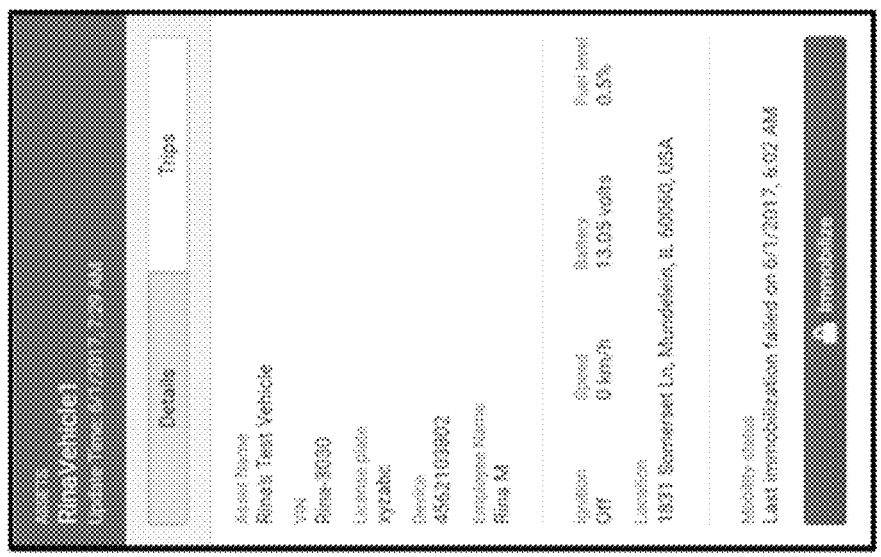
400'''  FIG. 4D

- Trips: monthly and daily start and end time, start and end location, total distance, duration, fuel usage and efficiency for trip segments

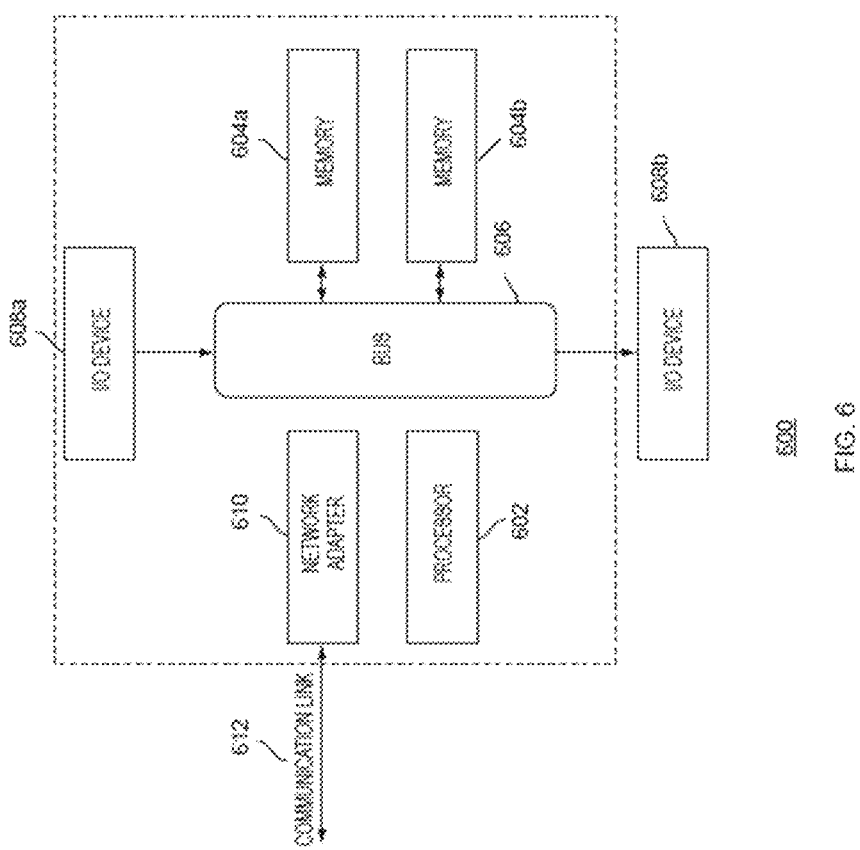

SYSTEM AND METHOD FOR MONITORING LOCATION AND ACTIVITY OF DEVICES

CROSS-REFERENCE TO RELATED APPLICATIONS

Under 35 USC 119(e), this application claims priority to U.S. provisional application Ser. No. 62/523,749, entitled "SYSTEM AND METHOD FOR MONITORING LOCATION AND ACTIVITY OF DEVICES", filed on Jun. 22, 2017, and is related to U.S. application Ser. No. 15/970,061, entitled "LEARNING COMMON ROUTES AND AUTOMATIC GEOFENCING IN FLEET MANAGEMENT", filed May 3, 2018, which claims priority to U.S. Provisional Application No. 62/523,748, entitled "LEARNING LOCATIONS OF INTEREST USING IoT DEVICES", filed on Jun. 22, 2017 and U.S. application Ser. No. 16/014,126, entitled "LEARNING LOCATIONS OF INTEREST USING IoT DEVICES", filed on Jun. 21, 2018, which claims priority to U.S. Provisional Application No. 62/523,748, filed Jun. 22, 2017, entitled "LEARNING LOCATIONS OF INTEREST USING IoT DEVICES", all of which are incorporated herein by reference in their entirety.

FIELD OF THE INVENTION

The embodiments described herein relate generally to communication networks and more particularly to monitoring location and activity of devices that are capable of moving, connected to a wireless communications network, such as a cellular network, and that share other characteristics, such as belonging to a commercial fleet of vehicles.

BACKGROUND

In many Internet-of-Things (IoT)/Machine-to-Machine (M2M) solutions, particularly running on moving machines, for example, vehicles, it may be useful to the fleet operator to track not only the vehicles, but who is driving, what job they are working on and/or the location of the vehicle.

SUMMARY

In one example embodiment, a computer implemented method for providing job status information for at least one IoT device is disclosed. The method includes receiving location information of the at least one IoT device; receiving job assignment information for the at least one IoT device; and evaluating the location information to determine the job status for the at least one IoT device based on a specified condition.

In another example embodiment, a system for providing job status information for at least one IoT device is disclosed. The system includes at least one IoT device, a data processing system and a user interface, wherein the data processing system further comprises a storage database, wherein the storage database receives location information of the at least one IoT device and job assignment information for the at least one IoT device; an analytics engine, wherein the analytics engine evaluates the location information to determine the job status for the at least one IoT device based on a specified condition.

In an embodiment, a non-transitory computer-readable medium is disclosed. The non-transitory computer-readable medium having executable instructions stored therein that, when executed, cause one or more processors corresponding to a system having a database and a user interface to perform operations including receiving location information of the at least one IoT device; receiving job assignment information for the at least one IoT device; and evaluating the location information to determine the job status for the at least one IoT device based on a specified condition.

BRIEF DESCRIPTION OF THE DRAWINGS

FIGS. 4A-H illustrate exemplary user interface for using the system and method for monitoring location and activity of devices according to an embodiment described herein.

FIG. 5A-C illustrate exemplary user interface for using the system and method for monitoring location and activity of devices according to an embodiment described herein.

FIG. 6 illustrates a data processing system 600 suitable for storing the computer program product and/or executing program code relating to monitoring location and activity of devices in accordance with an embodiment described herein.

DETAILED DESCRIPTION

Figure 1:
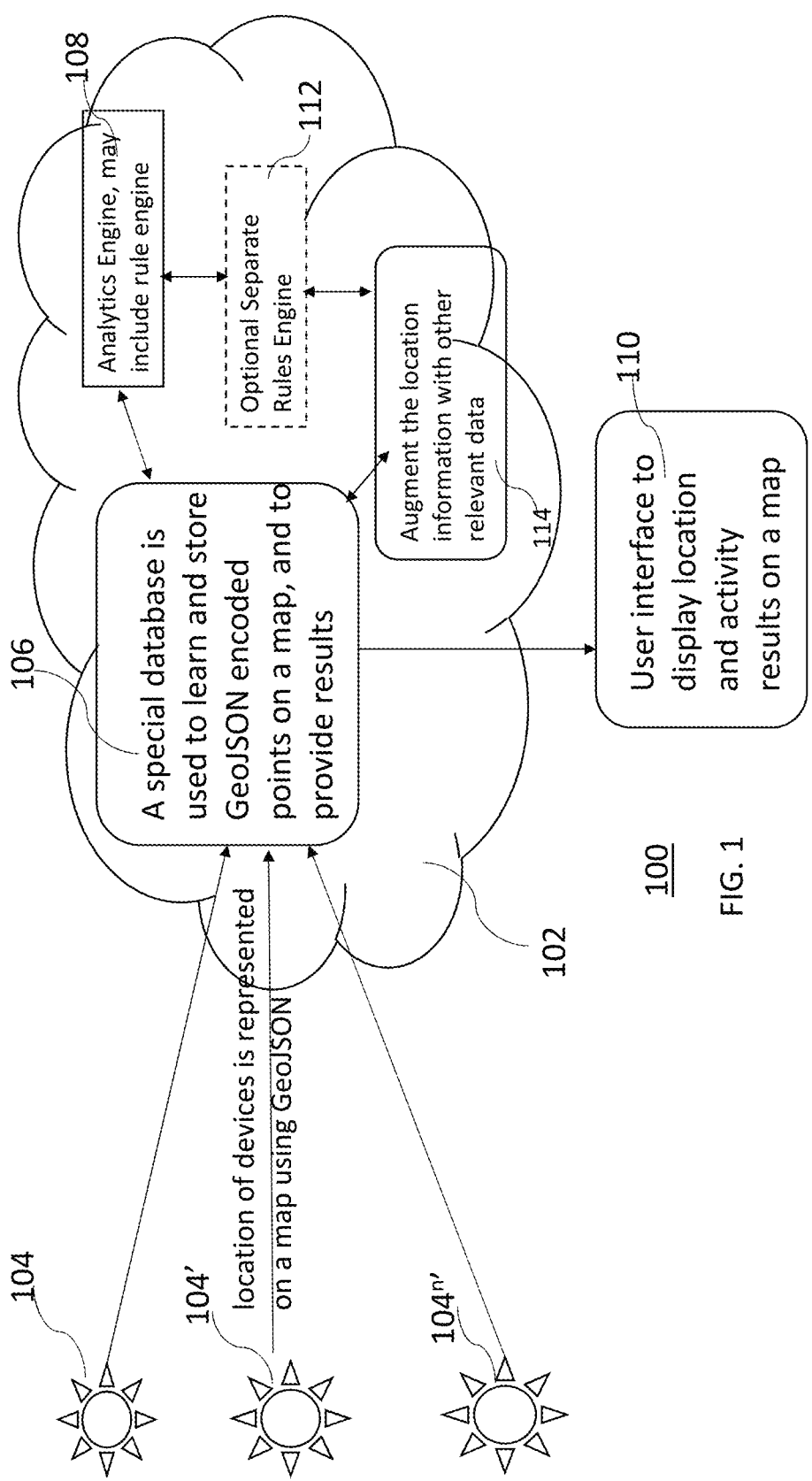
FIG. 1 is an overview diagram for the method and system for monitoring location and activity of devices according to an embodiment described herein.

The embodiments described herein relate generally to communication networks, which may be cellular and/or wireless networks and more particularly to monitoring location and activity of IoT devices or mobile devices that are capable of moving, connected to a wireless communications network, such as a cellular network, and that share other characteristics, for example, vehicles belonging to a commercial fleet of vehicles. The IoT devices or the mobile devices have the ability to transmit data over the internet. The transmission may also take place, for instance, through a blue-tooth connection to one's phone which uses cellular connectivity. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the embodiments described herein are not intended to be limited to the embodiments shown, but is to be accorded the widest scope consistent with the principles and features described herein.

Many Internet-of-Things (IoT)/Machine-to-Machine (M2M) solutions, particularly running on moving machines, for example, vehicles, it may be useful to the fleet operator to track not only the vehicles, but also who is driving, how they are driving, what job they are working on, when they are expected to complete the job, and/or the location of the vehicle. Operators of the mobile devices, for example, driver of the vehicles performing jobs may not have access to cellular connectivity throughout their job performance, in which case status of the job may be tracked or monitored using location of the vehicle. The location of the vehicle may provide information whether the vehicle is at a depot, at a pick up location, in transit or at a drop off location and based on this information, status of the assigned job may be deduced.

A job may be defined as an activity of taking a particular load from one location to another location or may include pick up from multiple locations and deliveries to multiple locations using one or more vehicles. Once a job is received, the information regarding the job is entered into the monitoring system including a starting point of the job, an end point of the job, or multiple pickup and drop-off points during a particular job/journey, vehicle information for the vehicle assigned to a particular job, driver information for the driver assigned to a particular job, expected start time of the job, expected end time of the job, information of the customer providing the job, etc. For example, the display on the user interface may show any or all of: driver A is driving vehicle B at time XX, performing job Y job, and the current job status is Z. In addition, a job may also include automatic jobs. For example, based on previous job history data, the claimed invention can automatically learn what type of job the driver is doing, where they are going to, etc. In other words, using device history and/or job history and data analytics to learn job behavior also known as job status.

The system and method for monitoring location and activity of the devices connected to the cellular network described herein can track the status of a job, for example, not started, waiting to be started, in progress, completed, etc.; overall on-time completion rate, for example, % of jobs completed on-time versus % of jobs not completed on-time; job completion performance of drivers, for example, on-time completion rate; driving behavior of drivers, for example, driver score where higher score means better driving behavior and may include criteria such as but not limited to excessive braking, acceleration, hard left or right turns etc. The system and method may also monitor completion rate of jobs for different customers and by different drivers. The fleet operators, also known as the subscribers may also provide access to their customers for whom the jobs are being performed so that they can see the vehicles that are performing their jobs and also know the expected time, date etc. of completion.

The system and method may additionally or alternatively set up alerts so that customers may know when the jobs are assigned and/or the information of the device performing the job, when the assigned job has started, for example, the vehicle has picked up the load; when the assigned job is about to be completed, for example, the vehicle is near the delivery location; and when the job is completed, for example, the vehicle has delivered the load.

The system and method may additionally or alternatively, automatically assign drivers & vehicles to jobs based on availability, size of load to match with the vehicle, proximity of the vehicle to pick up location, driver behavior, driver score etc.

The system and method may additionally or alternatively, provide the expected location of the vehicle at a particular time of the day of the week, and/or on a specific date by using analytics. This may be determined by observing vehicle data patterns based on various parameters including but not limited to: day of week and time of the day, day of the month etc. and may take into account holidays, or other major natural disaster events such as severe weather events.

Generally, customers would have to manually look at a map view to determine the location of each vehicle from a fleet of vehicles at a given time of the day. This process is a tedious and cumbersome activity that may require either phone calls to or from the drivers of the vehicles, and/or check ins/signing in by the drivers and/or end customers, e.g., recipients of the deliveries. The fleet managers may have to sit in front of a computer to determine the location of each vehicle from a fleet of vehicles at a given time of the day, especially with larger fleets.

The system and method described herein provides users, e.g., fleet operators, with a unique visualization of their fleets of assets/vehicles. The system may provide the user with a report with an overview of their vehicle's locations in relation to their saved destinations/places. The user may be provided with a summary of how many vehicles are in each saved location or are in transit. Thus, the key aspect of the method and system described herein is to display the locations of vehicles in a unique and summarized fashion that gives users an immediate and detailed view of the vehicle status belonging to a particular fleet.

The system and method described herein also helps the fleet manager to determine if any of his vehicles or drivers have issues related to vehicle performance, fuel level, traffic conditions etc. and/or if the drivers of the vehicles are not completing deliveries as expected.

Additionally, the solution is provided as both, a web application and a mobile application, and hence allows the fleet manager to view the state of individual vehicles belonging to a particular fleet without calling drivers or without drivers physically having to check in or report from various job locations, and without sitting in front of a computer monitoring the individual vehicles in the fleet.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 is an overview diagram for the method and system for monitoring location and activity of devices according to an embodiment described herein. FIG. 1 illustrates system configuration 100 including mobile devices 104, 104' . . . 10e, a data processing system 102 including a storage database 106, analytics engine 108, optional rules engine 112, and a user interface 110. A system for monitoring location and activity of devices includes a storage database 106, wherein the storage database 106 receives location information from the mobile device 104 and job assignment information for the mobile devices 104; an analytics engine 108, wherein the analytics engine 108 evaluates the location information to determine the job status for the at least one IoT device or a mobile device based on a specified condition. In an embodiment, the rules engine 112 may be provided as a part of the analytics engine 110 or as a separate rules engine as illustrated by optional separate rules engine 112. The determination of job status based on conditions specified may include determining if the location of the vehicle is within a radius of proximity from any one or more of: start location of route for the job, destination location for the route for the job, one or more pick-up and drop-off points, location point along the route for the job.

For example, once a job is received, it is entered into the system as starting point/location, end point/location, or multiple pickup and drop-off points/locations, vehicle assigned to job, driver assigned to job, expected start time and expected end time and customer information including name and address of the customer. The method and system then tracks the location, e.g., latitude/longitude, street address etc., of the assigned device along with other device data including device activity. The method and system thus tracks the status of the assigned jobs based on the location of the device, for example, job not started, job in progress, or job completed. For example, if the vehicle is still in the depot, the job status may be determined as "not started", if the vehicle is on the way to a pick-up location or a delivery location, the job status may be determined as "in progress", if the vehicle is at a drop-off location or is leaving the drop-off location, the job status may be determines as "completed". The system and method may use other naming system and criteria to determine the job status for the IoT device or the mobile device as determined by the application provider and/or fleet operator.

Additionally or alternatively, the method and system may automatically detect that a vehicle is on a job based on location patterns and/or driver inputs e.g., destination location for a trip, multiple destinations, e.g., pick-up and drop-off locations, for a trip, checking out a vehicle from a depot etc. Location based data analytics may be used to automate the process for the repeat jobs based on data analytics and machine learning. Learned locations and/or learned routes enable the system to automatically detect a location pattern for a particular job and to create and use the automatic geofences created around learned locations, e.g., pick-up & drop-off locations, or geofences created around learned routes, e.g., based on starting location and destination location, to automate the creation and execution of a job.

In an embodiment, the location patterns may be based on learning new locations of interest and using the learned locations of interest to determine geofences for starting location of the trip, destination location for a trip, multiple destinations, e.g., pick-up and drop-off locations, for a trip, etc. This location detection and learning new location using IoT devices is described in the related U.S. patent application Ser. No. 16/014,126, entitled, "LEARNING LOCATIONS OF INTEREST USING IoT DEVICES", filed Jun. 21, 2018 which is incorporated herein by reference in its entirety.

Additionally or alternatively, the location patterns may be based on learning routes and using the learned routes to determine geofences for the routes to be taken by the vehicle to complete the assigned job based on starting location of the trip, destination location for a trip, multiple destinations, e.g., pick-up and drop-off locations, for a trip, etc. This learning routes and automatic geofencing using IoT devices is described in the related U.S. patent application Ser. No. 15/970,061, entitled "LEARNING COMMON ROUTES AND AUTOMATIC GEOFENCING IN FLEET MANAGEMENT", filed May 3, 2018 which is incorporated herein by reference in its entirety.

The method and system may also track the overall on-time completion rate (what % completed on-time versus not), job completion performance of drivers (on-time completion rate) and driver behavior including excessive braking, acceleration, hard left or right turns. The driver behavior may be analyzed to give a driver score, for example, higher score may mean better driving behavior. Alternatively or additionally, the method and system may also track completion rate of jobs for different drivers and/or for different customers.

The mobile devices 104, 104', . . . 104' or an IoT device may include IoT devices capable of communication, for example, vehicles connected to the cellular network or cellular-enabled devices via SIMs that are installed in the mobile devices as either integrated in the vehicle itself or removably installed in the vehicle on each of the fleet vehicle. These communication devices could be devices using a radio module and Wifi, or any other wireless communication technology that are capable of transmitting relevant vehicle data to database 106 and/or the data processing system 102 of the monitoring system. In an embodiment, the devices, e.g., vehicles, may have monitoring devices installed in them, that are also capable of communication via SIMs that are installed in them. These monitoring devices may also be devices using a radio module and Wifi, or any other wireless communication technology that are capable of transmitting relevant vehicle/monitoring data to database 106 and/or the data processing system 102 of the monitoring system.

Moving devices or IoT devices either directly or via monitoring devices installed in them send various data to a database as they perform their jobs. This data may be processed further by extracting information for relevant fields using application programming interface (API) keys to read data contained in specific data fields.

In an embodiment, the data may be containerized and stored based on a subscription identifier. The data is accessed through APIs using API keys and user authentication to securely transmit the data. Management of data received from these devices and access to application specific data to be used by specific applications is described in a related U.S. patent application Ser. No. 14/207,378, entitled, "MANAGEMENT OF DATA FEEDS FROM DEVICES AND PUBLISHING AND CONSUMPTION OF DATA" filed Mar. 12, 2014 and is herein incorporated by reference in its entirety.

In another embodiment, device data sent directly from the devices to the storage database may be used, where the data may be accessed through APIs using API keys and user authentication to securely transmit the data.

In yet another embodiment, the device data is sent to a data processor, e.g., an adapter, where it is processed and then sent to the storage database to be used by the analytics engine or the data processing system.

Various data are collected from the moving devices either directly or via monitoring devices installed in them, as they perform their jobs. The data may be accessed through APIs using API keys and user authentication to securely transmit.

The system configuration 100 may include an instance of a client application with a user interface 110 hosted thereon, for example, a desktop fleet application provided through a web-based portal used by the fleet manager to manage fleet vehicles, and/or fleet application operating on mobile devices, such as smartphones, used by the fleet manager to manage fleet vehicles or by vehicle drivers to access the information on the go, anywhere, any time.

The learning or storage database 106 may be a special database, also known as a location aware database which is used to learn and store GeoJSON encoded points on a map, and to provide results, for example, an instance offered by a provider of cloud computing services. The data is gathered by the learning or storage database 106. The gathered data may include route information along with the device records, for example, device identifier, start location of the route, destination location for the route, location of the device at time $t=0 \ldots t=n$, time of the day for the travel, day of the week for the travel, time taken for or duration of the travel, distance covered during the travel, etc. The system may further involve usage of a computer to determine proximity to a location of interest, e.g., starting location, ending location, locations on route etc., among a vast number of locations on a map using radius of proximity.

Once a job is received, it is entered into the system as starting point, end point, or multiple pickup and drop-off points, vehicle assigned to job, driver assigned to job, expected start time and expected end time and customer information including name and address of the customer. This data is also saved to a database which may be the same as a database storing gathered device information or different from the database storing gathered device information, described above.

The algorithm may first scan through the device records and arrange them sequentially with respect to time. It may then detect times and places the device has visited over time during performance of a job by the analytics engine 110. The algorithm may then make a decision about job status of the device based on location data gathered and transmitted by the device within the learning/storage database 106. For example, the vehicle has picked up the load, when the vehicle leaves the location from where the load is supposed to be picked up; the assigned job is about to be completed when the vehicle is near the delivery location; or the job is completed, when the vehicle has reached and/or left the delivery location. This may be done real-time or near real-time.

In an embodiment, the system and method may additionally or alternatively set up alerts so that customers may know when the jobs are assigned and/or the information of the device performing the job, when the assigned job has started, for example, the vehicle has picked up the load; when the assigned job is about to be completed, for example, the vehicle is near the delivery location; and when the job is completed, for example, the vehicle has delivered the load.

This data may be augmented with other relevant data by the data augmentation engine 114, for example, the received location information may be augmented with more information like association of the detected location from the gathered device data with the known address of a business or activity of a certain type (e.g., restaurant, monument or place of worship). This information may either be entered by the fleet operator or derived from map services provided by third-parties. This data augmentation allows the system and method to associate an 'intent' when drivers are seen approaching a known place. This augmented information may then be presented to the fleet operator to enter addresses of start and end locations using pop-up list of addresses. A fleet operator may be a person who is responsible for managing fleets. Each account may have one or more fleets connected to it.

The rules engine 112 of the data processing system 102 may determine proximity of the locations derived from the device location data to the start and end locations and/or the locations on the route of the job by using a radius of proximity that may be defined by the user or provided to the system. If the received location data is within the radius of proximity of an already defined place, it is assumed that the vehicle is moving as planned. Otherwise, the location date is treated as a diversion from the job route and may be added to the storage database 106 and an alert may be issued.

The algorithm may be designed to work within the SaaS (Software as a Service) model where one physical database may be maintained for all accounts and that data used on an aggregate basis to assist the rules engine 112 in determining significance of visited places, but actual data of devices identified to each account is kept separate for each account and processed and displayed exclusively for that account within the database.

The actual process of monitoring location and activity of devices may be triggered by a streaming API that delivers and/or analyzes a trip as soon as it begins and stores the locations the device travels, as well as the stop locations or end locations during the trip. An alternate way to trigger the monitoring of location and activity of devices process may be through using a script that runs at periodic intervals, for example, once a day, once a week etc. Alternatively, the monitoring of location and activity of devices process may be defined as an ongoing process, collecting device data in real time or near-real time.

The device locations that are detected within a proximity radius of, e.g., 0.1 mile or 0.2 miles, from a place on the job route or starting and/or ending locations, or multiple pick-up and drop-off locations for a particular job may be determined by the system as the location at that point. For example, if the location of the vehicle is detected to be 0.1 mile from the starting point of the job route, the vehicle may be determined to be at the starting point of the job route. The radius of proximity may thus define the granularity of the location of the device on a map. Several such device locations with different radii of separation—all of which may be derived from the base collection with a predetermined granularity, may be stored in database 108 and presented to the user via user interface 118. Although 0.1 miles, 0.2 miles are used as examples, different radii of proximity may be used as defined by the system and/or chosen or determined by the user.

Figure 2A:
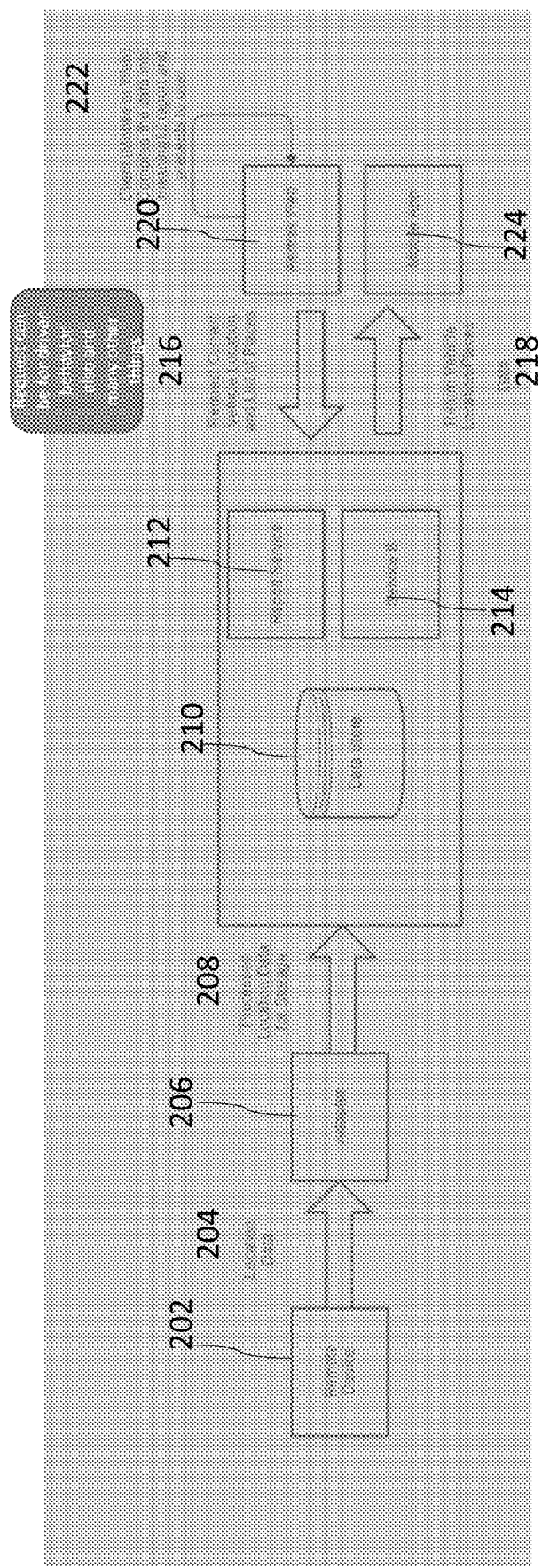
FIG. 2A illustrates an exemplary system and process flow for the system and method for monitoring location and activity of devices according to an embodiment described herein.

FIG. 2A is an example configuration and process flow for the method and system for monitoring location and activity of devices according to an embodiment described herein. In an embodiment, the system for providing job status information for one or more IoT devices includes a storage database 210, which may be a location-aware database. The storage database receives location information from the at least one IoT device 202 via steps 204 and 208 through adapter 206. Adapter 206 is a data processor that processes location data by analyzing and sorting the received device data. The fleet adapter 206 may be a network endpoint component which understands the device protocol, e.g., TCP, UDP, interprets the received data and sends it to the storage database 210 which may be a physical database or may be a cloud database. The storage database also receives job assignment information for the at least one IoT device 202. The system further includes an analytics engine, also known service B 210, which is a job service that evaluates location info to determine job status, and a report service 212 which generates reports by compiling the relevant information retrieved from the one or more databases. The analytics engine 210 evaluates the location information to determine the job status for the at least one IoT device based on a specified condition. The determination of job status based on conditions specified may include determining if the location of the vehicle is within a radius of proximity from any one or more of: start location of route for the job, destination location for the route for the job, one or more pick-up and drop-off points, location point along the route for the job, e.g., if the vehicle is still in the depot, the job status may be determined as "not started", if the vehicle is on the way to a pick-up location or a delivery location, the job status may be determined as "in progress", if the vehicle is at a drop-off location or is leaving the drop-off location, the job status may be determines as "completed". This information may be accessed by web based application 220 via step 216 or mobile application 224 via step 218. Mobile or Web client may compile the data into meaningful report and present it to the user via step 222.

The main logic for this feature is handled on the client which may be a mobile application or a web application. The logic is as follows: Current location for desired vehicles, which may be specific vehicles or all vehicles belonging to a particular fleet, is retrieved from the data store. This may be done by retrieving data from the server or a data storage, which may be a physical data storage or may be cloud based data storage, by using representational state transfer (REST) webservices that will in turn obtain data from microservice via message queues. The microservices are responsible for retrieving data from a data store. For example, a client may request data from server through the client facing REST services using message: GET ASSET Location (api/fleet/assets), and the server may provide data using the response including AssetID, Latitude and longitude. This is passed back as a JSON OBJECT, as shown below.

```
{
    "sequenceNumber": 29065,
    "updateTime": 1529433160,
    "timeOfFix": 1529433160,
    "latitude": 11.746055,
    "longitude": 11.9934163,
    "altitude": 39553,
    "speed": 0,
    "heading": 8,
    "satellites": 12,
    "carrier": 20,
    "rssi": -87,
    "hdop": 0.8,
    "inputs": 3,
    "fixStatus": 2,
    "eventType": 10,
    "devicePowerVoltage": 13,
    "assetState": on
},
{
    "sequenceNumber": 29064,
    "updateTime": 1529433100,
    "timeOfFix": 1529433100,
    "latitude": 11.74604559999999,
    "longitude": 11.9934183,
    "altitude": 39606,
    "speed": 0,
    ...
```

New data may be posted or existing data may be updated into the data storage via the adapter 206 as described above. Since the use of REST webservices is based on API, no user interface and/or human interaction may be involved in retrieving data from the server. The REST API services retrieve data through microservices. Microservices may help retrieve different information via smaller queries, generally performing a single function, from NO-SQL data structures or distributed databases, e.g., Cassandra, MongoDB etc. This retrieved information may then be compiled in a report format, based on user requests.

All data, including geofence, for places associated with the fleet are retrieved from the data store using REST web services via microservices as described above. The received device data e.g., vehicle locations are compared to the geofence data to determine the following: (a) Count of vehicles associated with a given place; (b) Counts of vehicles with no last known location; (c) Counts of vehicles not in a specific location (in transit); (d) When the vehicles count doesn't match with the number of vehicles in the fleet, there will be "*" next to the total count of vehicles on both top and bottom of the status summary. Once the results are obtained, they may be compiled in a desired format and rendered to the mobile and/or web interface as desired by the user.

Additionally, or alternatively, the method and system may also include data analytics based on historical data for a particular job based on location parameters associated with that job, e.g., starting locations, destination location, pick-up and drop-off locations etc., and other conditions, e.g., traffic conditions based on day of the week, time of the day etc., may predict expected location of the vehicle at a particular time and may highlight anomalies to the user.

For example, once a job is received, it is entered into system as starting point, end point, or multiple pickup and drop-off points, vehicle assigned to job, driver assigned to job, expected start time and expected end time and customer information including name and address of the customer. The method and system then tracks the location of the assigned device along with other device data including device activity. The method and system thus tracks the status of the assigned jobs based on the location of the device, for example, job not started, job in progress, or job completed. For example, if the vehicle is still in the depot, the job status may be determined as "not started", if the vehicle is on the way to a pick-up location or a delivery location, the job status may be determined as "in progress", if the vehicle is at a drop-off location or is leaving the drop-off location, the job status may be determines as "completed". The system and method may use other naming system and criteria to determine the job status for the IoT device.

Location based data analytics may be used to automate the process for the repeat jobs based on data analytics and machine learning. For example, the method and system may automatically detect that a vehicle is on a job based on location patterns and/or driver inputs e.g., destination location for a trip, multiple destinations, e.g., pick-up and drop-off locations, for a trip, checking out a vehicle from a depot etc. Learned locations and/or learned routes enable the system to automatically detect a location pattern for a particular job and to create and use the automatic geofences created around learned locations, e.g., pick-up & drop-off locations, or geofences created around learned routes, e.g., based on starting location and destination location, to automate the creation and execution of a job.

In an embodiment, the location patterns may be based on learning new locations of interest and using the learned locations of interest to determine geofences for starting location of the trip, destination location for a trip, multiple destinations, e.g., pick-up and drop-off locations, for a trip, etc. This location detection and learning new location using IoT devices is described in the related U.S. patent application Ser. No. 16/014,126, entitled, "LEARNING LOCATIONS OF INTEREST USING IoT DEVICES", filed Jun. 21, 2018 which is incorporated herein by reference in its entirety.

Additionally or alternatively, the location patterns may be based on learning routes and using the learned routes to determine geofences for the routes to be taken by the vehicle to complete the assigned job based on starting location of the trip, destination location for a trip, multiple destinations, e.g., pick-up and drop-off locations, for a trip, etc. This learning routes and automatic geofencing using IoT devices is described in the related U.S. patent application Ser. No. 15/970,061, entitled "LEARNING COMMON ROUTES AND AUTOMATIC GEOFENCING IN FLEET MANAGEMENT", filed May 3, 2018 which is incorporated herein by reference in its entirety.

The method and system may also track the overall on-time completion rate (what % completed on-time versus not), job completion performance of drivers (on-time completion rate) and driver behavior including excessive braking, acceleration, hard left or right turns. The driver behavior may be analyzed to give a driver score, for example, higher score may mean better driving behavior. Alternatively or additionally, the method and system may also track completion rate of jobs for different customers.

Figure 2B:
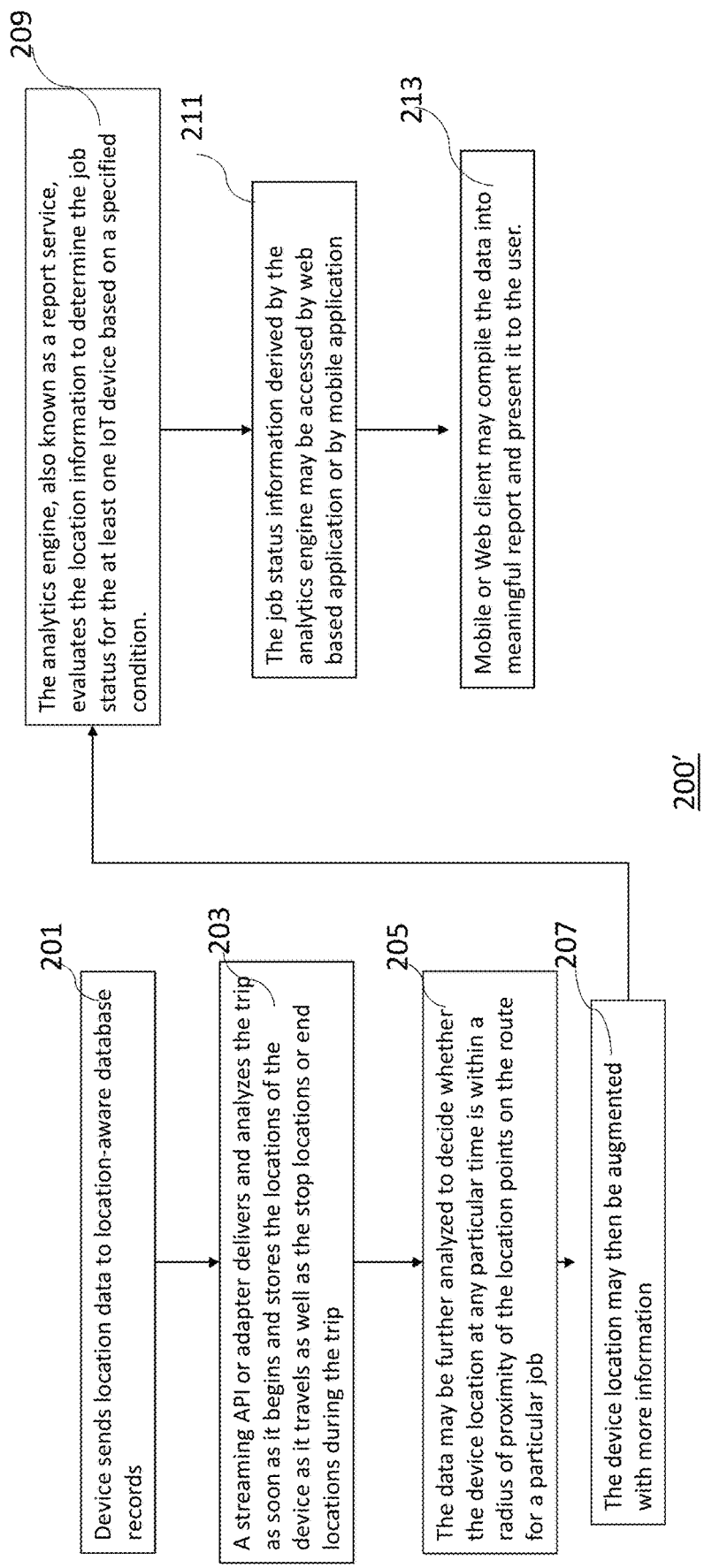
FIG. 2B illustrates an exemplary process flow for the system and method for monitoring location and activity of devices according to an embodiment described herein.

FIG. 2B illustrates an exemplary process flow for the system and method for monitoring location and activity of devices according to an embodiment described herein. As illustrated in FIG. 2B, one or more IoT devices send location data to location-aware database records via step 201. A streaming API delivers and analyzes the trip as soon as it begins and stores the locations of the device as it travels as well as the stop locations or end locations during the trip via step 203. The data may be further analyzed to decide whether the device location at any particular time or at that time is within a radius of proximity of the location points on the route for a particular job via step 205. The device location may then be augmented with more information via step 207. The analytics engine, also known as a report service, evaluates the location information to determine the job status for the at least one IoT device based on a specified condition via step 209. The job status information derived by the analytics engine may be accessed by web based application or by mobile application via step 211. A mobile or Web client may compile the data into meaningful report and present it to the user via step 213.

For example, once a job is received, it is entered into the system as starting point/location, end point/location, or multiple pickup and drop-off points/locations, vehicle assigned to job, driver assigned to job, expected start time and expected end time and customer information including name and address of the customer. The method and system then tracks the location, e.g., latitude-longitude, street address, etc, of the assigned device along with other device data including device activity. The method and system thus tracks the status of the assigned jobs based on the location of the device, for example, jobs not started, job in progress, or job completed. For example, if the vehicle is still in the depot, the job status may be determined as "not started", if the vehicle is on the way to a pick-up location or a delivery location, the job status may be determined as "in progress", if the vehicle is at a drop-off location or is leaving the drop-off location, the job status may be determines as "completed". The system and method may use other naming system and criteria to determine the job status for the IoT device as determined by the application provider and/or fleet operator.

Additionally or alternatively, the method and system may automatically detect that a vehicle is on a job based on location patterns and/or driver inputs e.g., destination location for a trip, multiple destinations, e.g., pick-up and drop-off locations, for a trip, checking out a vehicle from a depot etc. Location based data analytics may be used to automate the process for the repeat jobs based on data analytics and machine learning. For example, the method and system may automatically detect that a vehicle is on a job based on location patterns and/or driver inputs e.g., destination location for a trip, multiple destinations, e.g., pick-up and drop-off locations, for a trip, checking out a vehicle from a depot etc. Location based data analytics may be used to automate the process for repeat jobs based on data analytics and machine learning. Learned locations and/or learned routes enable the system to automatically detect a location pattern for a particular job and to create and use the automatic geofences created around learned locations, e.g., pick-up & drop-off locations, or geofences created around learned routes, e.g., based on starting location and destination location, to automate the creation and execution of a job.

In an embodiment, the location patterns may be based on learning new locations of interest and using the learned locations of interest to determine geofences for starting location of the trip, destination location for a trip, multiple destinations, e.g., pick-up and drop-off locations, for a trip, etc. This location detection and learning new location using IoT devices is described in the related U.S. patent application Ser. No. 16/014,126, entitled, "LEARNING LOCATIONS OF INTEREST USING IoT DEVICES", filed Jun. 21, 2018 which is incorporated herein by reference in its entirety.

Additionally or alternatively, the location patterns may be based on learning routes and using the learned routes to determine geofences for the routes to be taken by the vehicle to complete the assigned job based on starting location of the trip, destination location for a trip, multiple destinations, e.g., pick-up and drop-off locations, for a trip, etc. This learning routes and automatic geofencing using IoT devices is described in the related U.S. patent application Ser. No. 15/970,061, entitled "LEARNING COMMON ROUTES AND AUTOMATIC GEOFENCING IN FLEET MANAGEMENT", filed May 3, 2018 which is incorporated herein by reference in its entirety.

The method and system may also track the overall on-time completion rate (what % completed on-time versus not), job completion performance of drivers (on-time completion rate) and driver behavior including excessive braking, acceleration, hard left or right turns. The driver behavior may be analyzed to give a driver score, for example, higher score may mean better driving behavior. Alternatively or additionally, the method and system may also track completion rate of jobs for different drivers and/or for different customers.

Figure 3A:
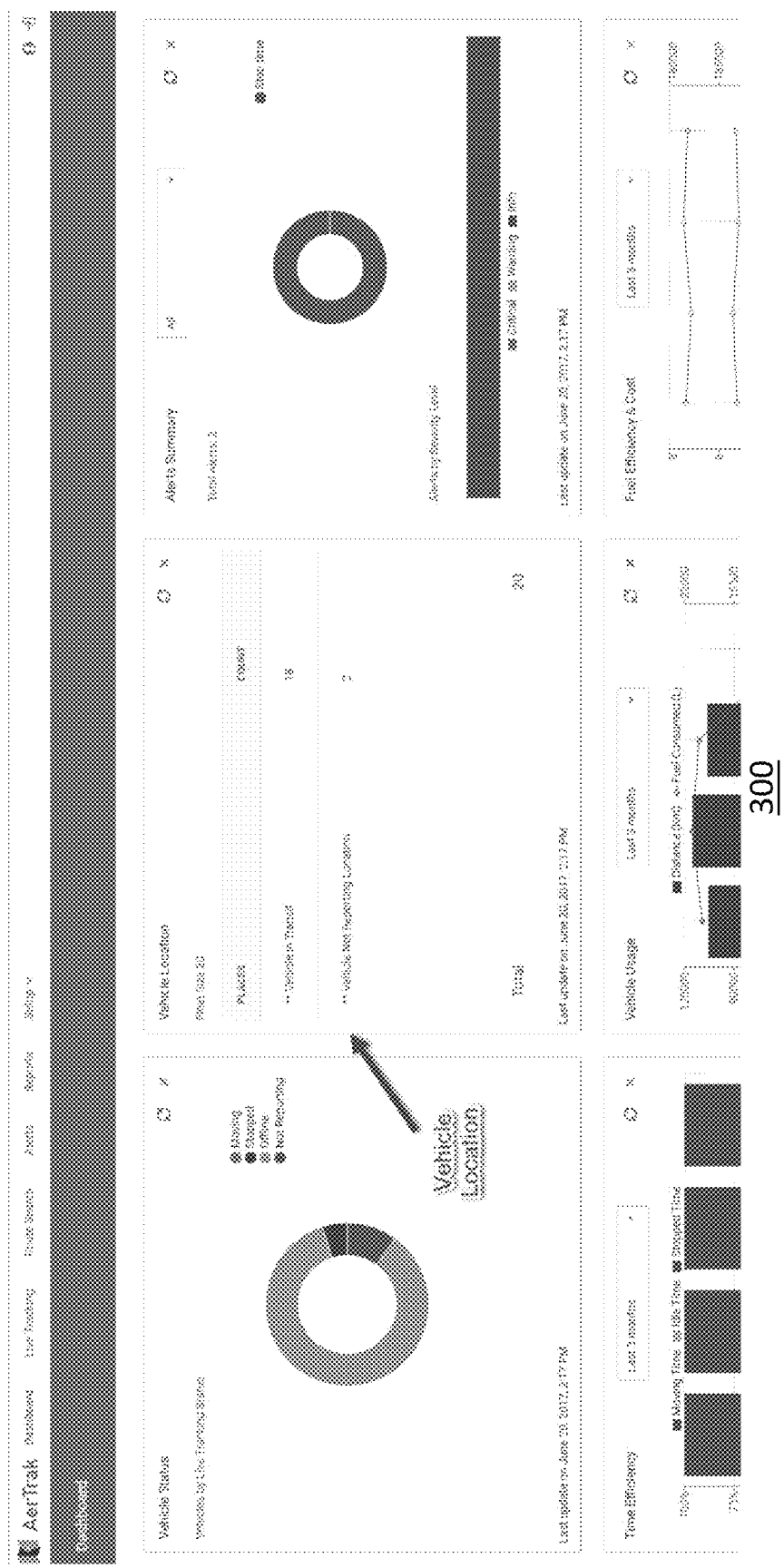
FIGS. 3A-B illustrate exemplary user interface for using the system and method for monitoring location and activity of devices according to an embodiment described herein.
Figure 3B:
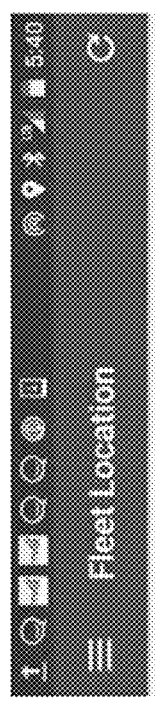

FIGS. 3A-B illustrate exemplary user interfaces for web and mobile applications using the system and method for monitoring location and activity of devices according to an embodiment described herein. FIG. 3A illustrates an exemplary user interface for a web application showing vehicle status, location, alert summary, time efficiency, vehicle usage, fuel efficiency and cost for the specified vehicle. Similar view is also available for a user interface for a mobile application.

FIG. 3B illustrates an exemplary user interface for showing fleet location and may include a summary of the location of vehicles whether at a specific place, in transit or at a location not known. In addition, the information shown in FIG. 3B may be rendered on a mobile screen as illustrated. Similar view is also available for a user interface for a web application.

The exemplary user interfaces described above and illustrated by FIG. 3A, for a web application; and 3B, for a mobile application, show the current state of a fleet in relation to the general location of vehicles. Users, e.g., fleet managers may use it to determine if one or more vehicles belonging to a particular fleet are at a correct location for the time of day, based on job assigned to that vehicle. Additionally, or alternatively, a mechanism may determine when the overall location of vehicles in the fleet are in an anomalous state for the current day and time based on the assigned job. Also, the times of day where the vehicle is not in a typical location may be indicated in a history view for that vehicle or for one or more vehicles belonging to a particular fleet.

FIGS. 4A-H illustrate exemplary user interface for using the system and method for monitoring location and activity of devices according to an embodiment described herein. For example, such an user interface may include in-depth vehicle location, history and trip activity.

Figure 4B:
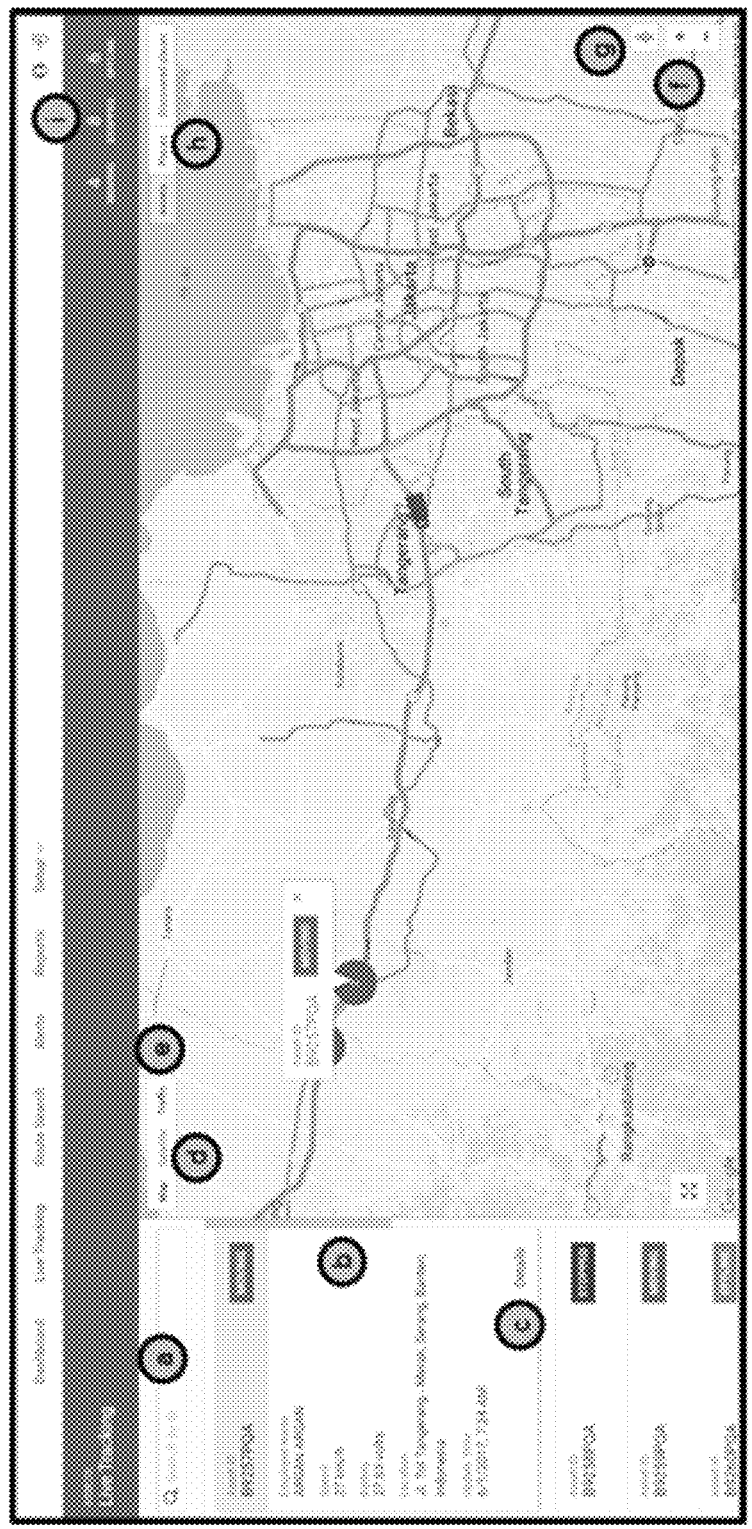

FIG. 4A illustrates live tracking which provides a convenient way to view high level and detailed information about vehicles and places. It also provides interactions that expose additional details about a vehicle. For example, clicking on a vehicle will expose additional details about that vehicle or by clicking on a circle will expose additional details about the vehicles at the location represented by that circle as illustrated in FIG. 4B.

FIG. 4B illustrates live tracking interactive map for the user to use live tracking feature, for example, (a) Search a vehicle by specifying the vehicle Id, or any vehicle related parameter, in the search box. This can be done by entering full or partial text to search the vehicle; (b) Click the vehicle card to view current details of vehicle including speed, battery voltage, location, and last update; (c) Click the Details button to view vehicle details as configured in the system, for example, vehicle name, VIN, License Plate, and so on; (d) Allows the user to toggle between Map and Satellite view; (e) Allows the user to view live Traffic on the map; (f) Allows the user to Zoom in/out the map; (g) Allows the user to see Street view of specific location by dragging it to that location; (h) Allows the user to mark locations of Vehicles, Places, and Discovered Places on the map, where user can select more than one of these options at a time; (i) Allows the user to filter vehicle list to be displayed on the map by their status as Moving, Stopped, and Offline. FIG. 4B also illustrates that by clicking on a circle will expose additional details about the vehicles at the location represented by that circle, e.g., asset ID 89257POA, moving etc.

Figure 4C:
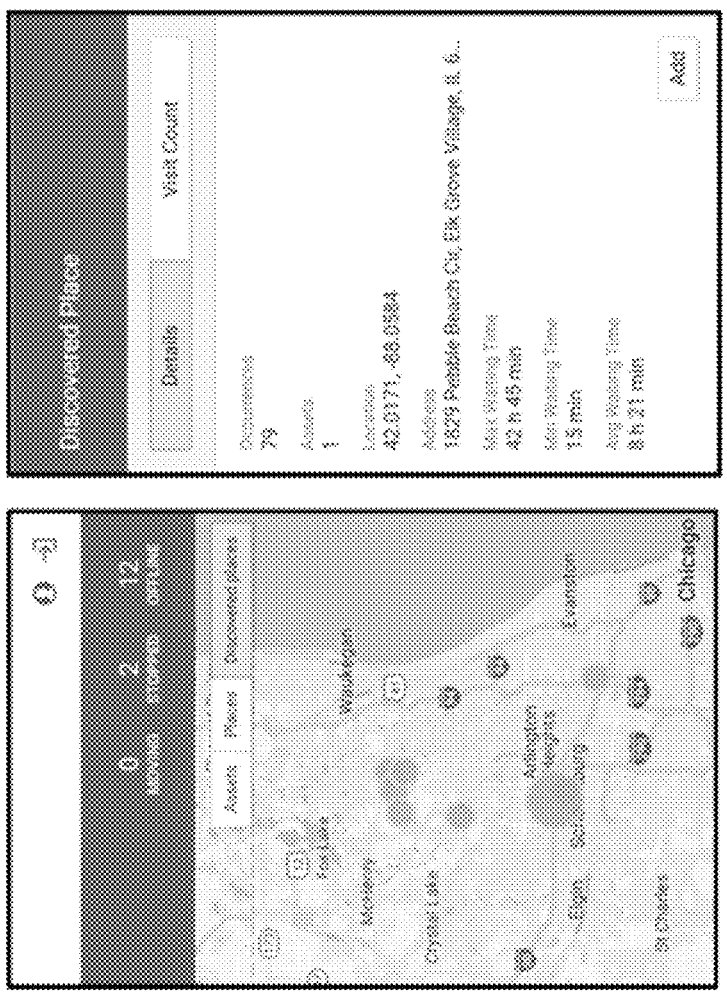

FIG. 4C illustrates location details of the vehicles at different locations including address of the location, time spent at that location, if the location is a known place or the discovered place etc. For example, the location data shown in FIG. 4B may illustrate the most frequently visited locations by the vehicles. For each frequently visited location, further details may be available.

FIG. 4D illustrates vehicle details show more information about vehicle attributes and vehicle data including last known location along with other data such as ignition status, speed, battery voltage and fuel level.

Figure 4E:
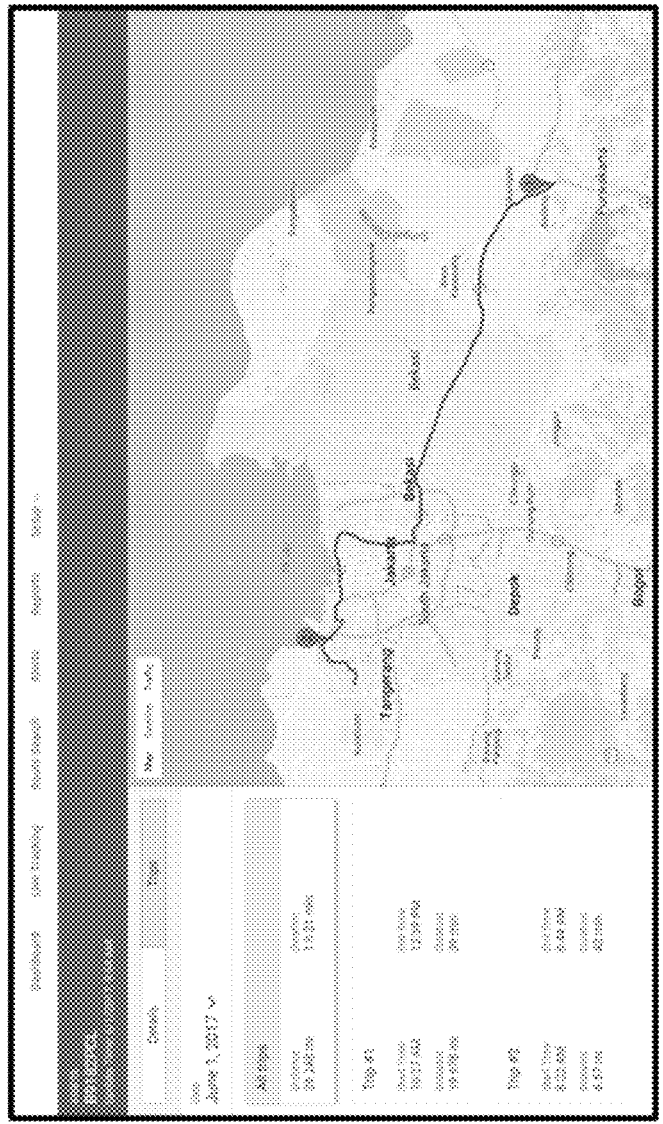

FIG. 4E illustrates trips and history where Trips are presented daily or by individual segments of a specific day. After clicking on the Vehicle's Trips, the current day's history is displayed when selecting All trips. Click Date to display the calendar and pick a different day. Map will number all trips of the day in order of their routing sequence.

Figure 4F:
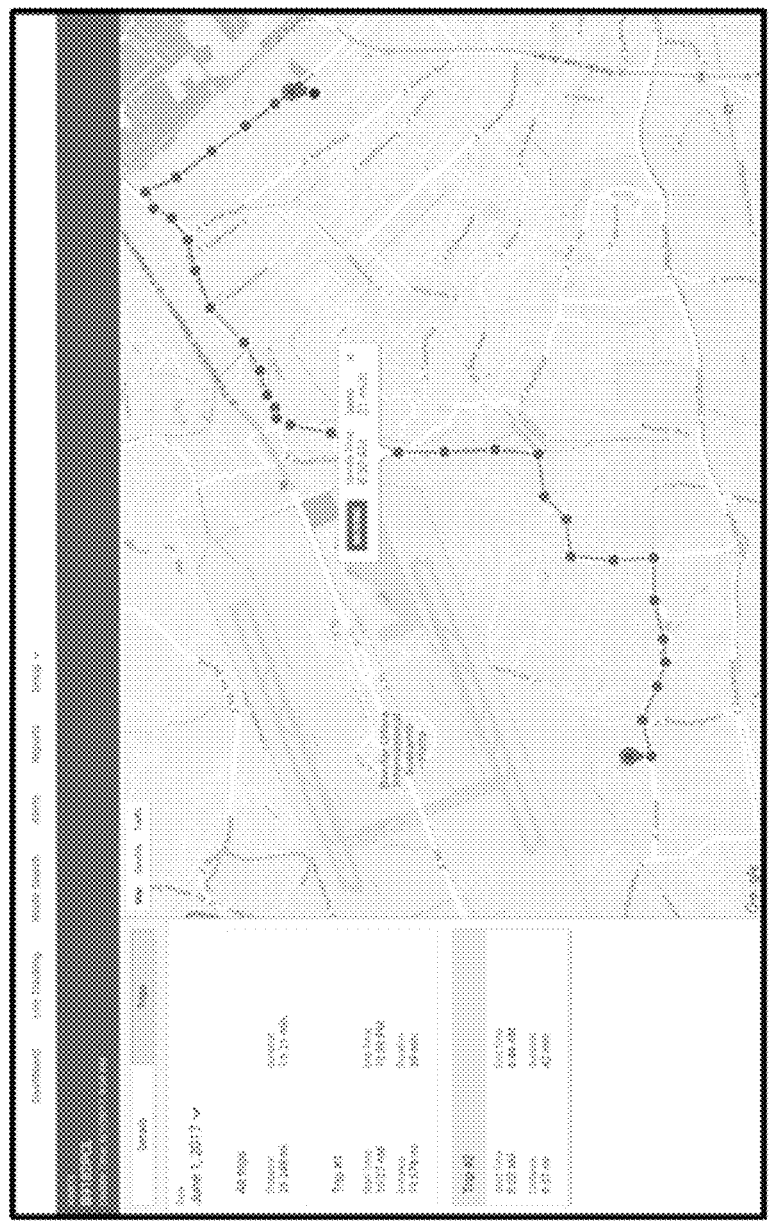

FIG. 4F illustrates an exemplary user interface used to view individual trips by clicking on Trips #. The display shows individual segment of the day with start and end time and location of the trip, breadcrumbs data during route. More data details such as status, time and speed may also be viewed.

Figure 4G:
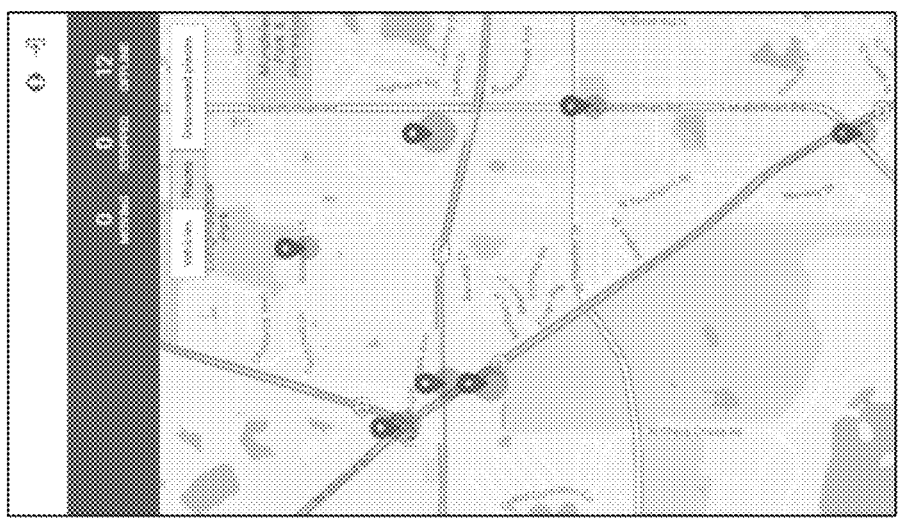

FIG. 4G illustrates any places/locations added by a user is shown by a location icon and a red circle representing its Geo-fence. The vehicles may be tracked if based on their location with respect to the geofence as well as time spent at that location, arrival time, departure time etc. A geo fence with allowable radius of proximity may be provided by the application provider and the user e.g., a fleet operator may be able to select a radius of proximity for the geofence chose by him for a particular vehicle or a number of vehicles belonging to a particular fleet. The device locations that are detected within a proximity radius of, e.g., 0.1 mile or 0.2 miles, from a place on the job route or starting and/or ending locations for a particular job may be determined by the system as the location at that point. For example, if the location of the vehicle is detected to be 0.1 mile from the starting point of the job route, the vehicle may be determined to be at the starting point of the job route.

Figure 4H:
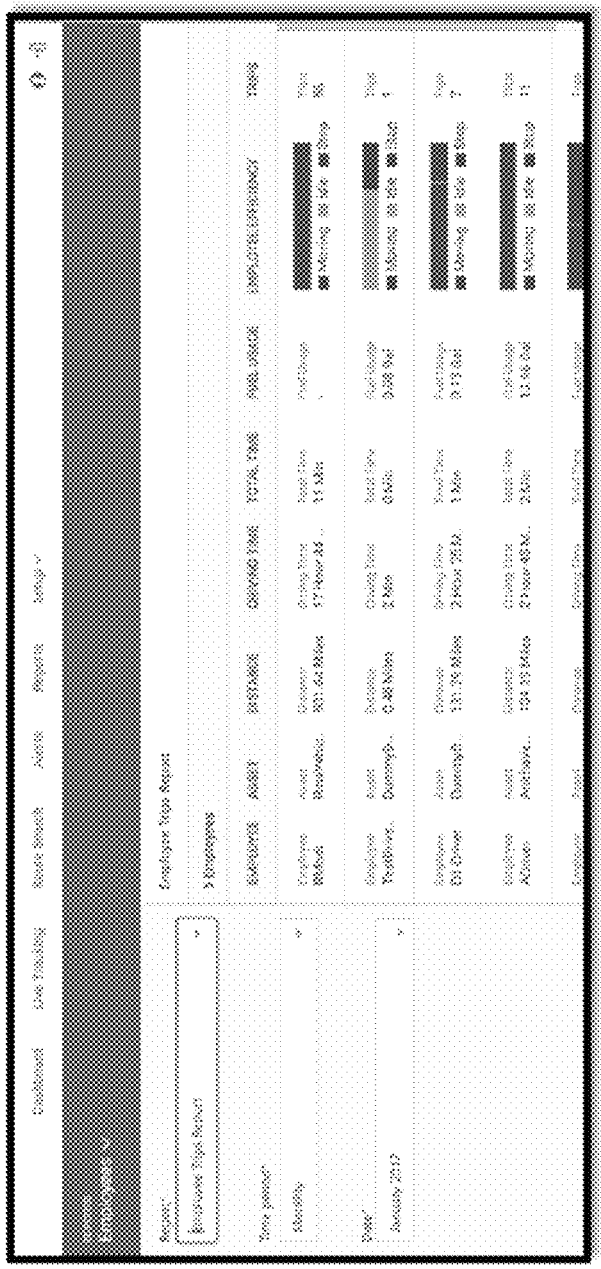

FIG. 4H illustrates an exemplary user interface, for example, trips interface to view the information about trips taken by different drivers and other relevant information like driver/employee, vehicle used, distance driven, driving time, total time, fuel used, efficiency, etc. The trips interface to view trip data, may include monthly, and daily start and end time, start and end location, total distance, duration, fuel usage, and efficiency for trip segments.

Figure 5A:
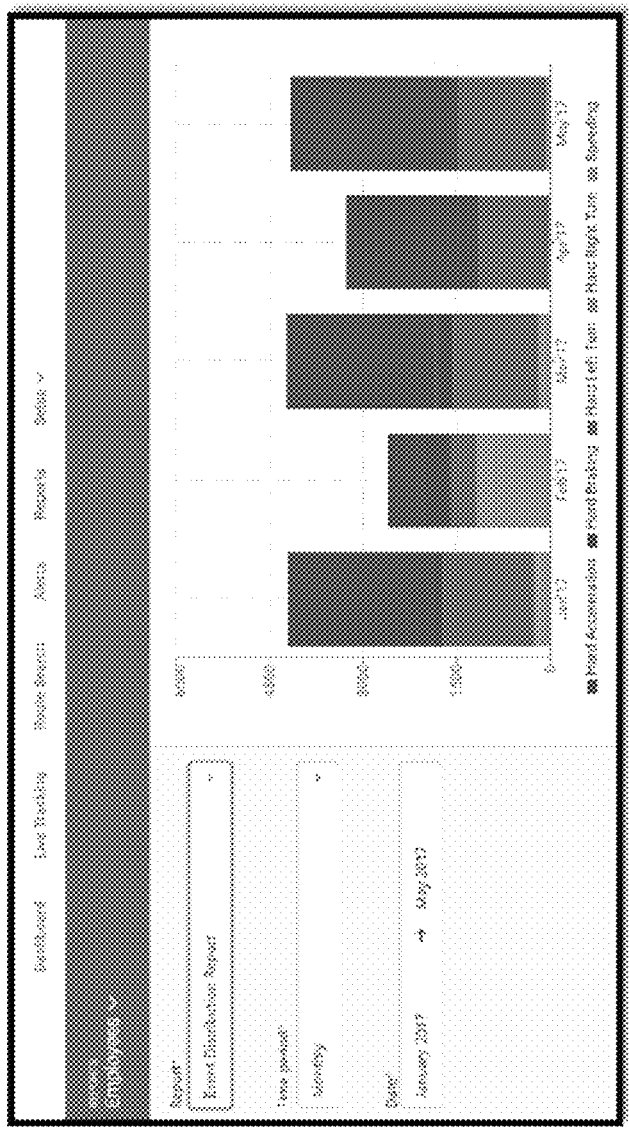
Figure 5B:
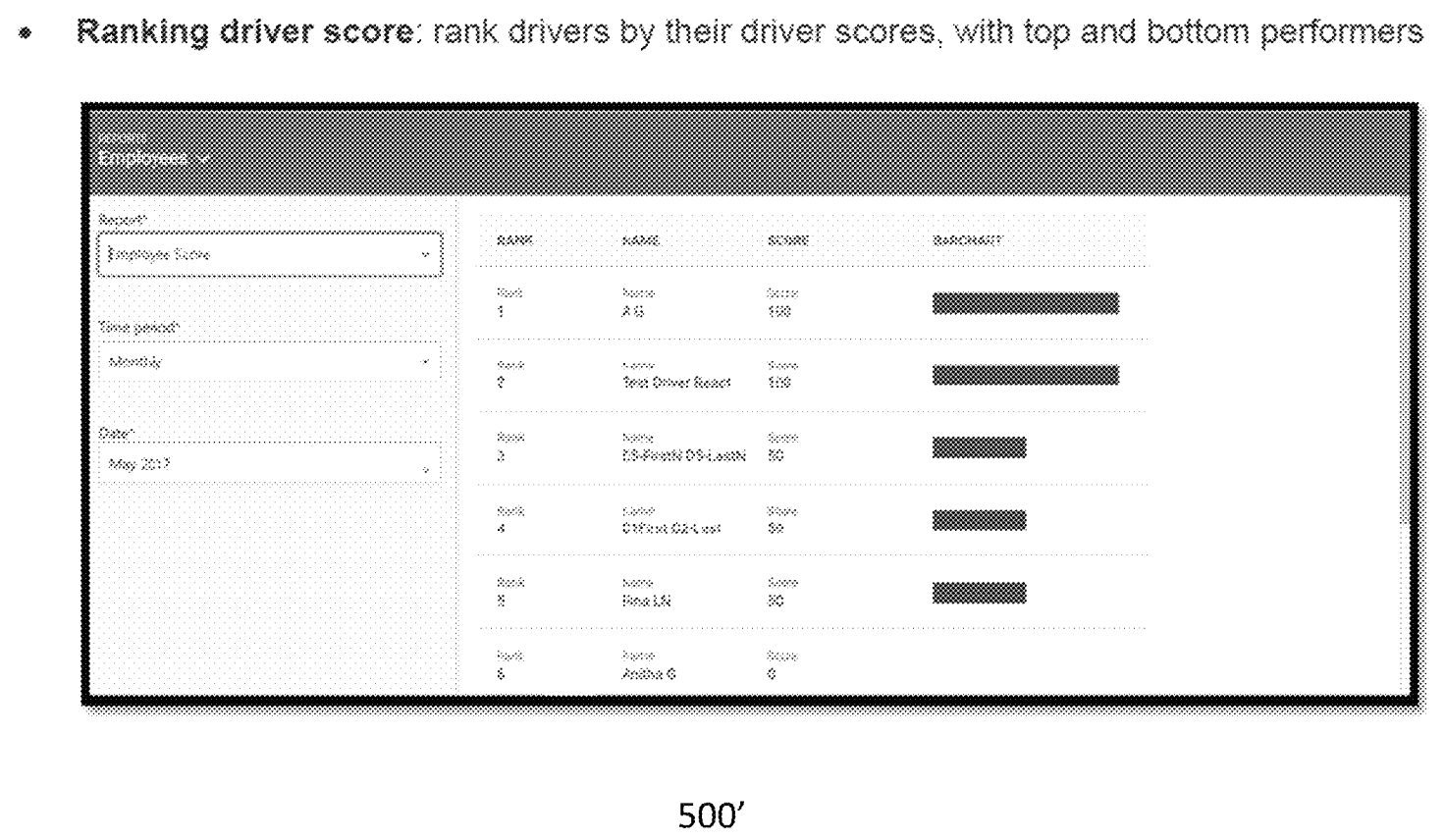
Figure 5C:
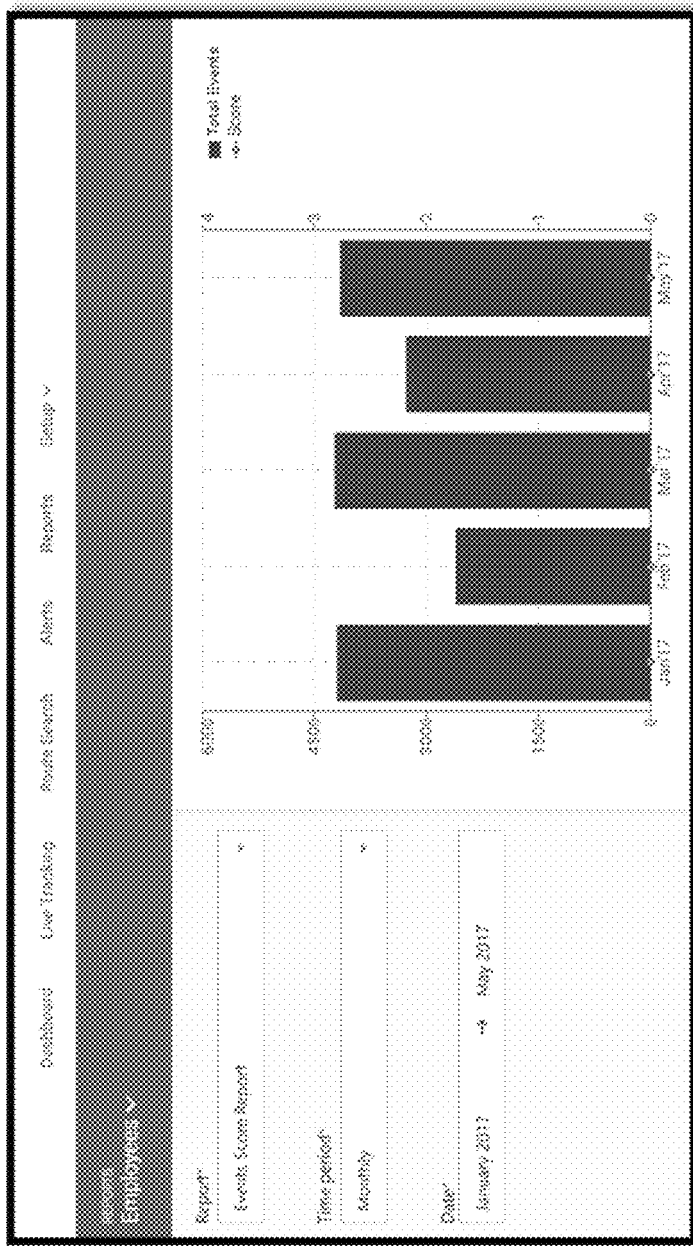

FIG. 5A-C illustrate exemplary user interface for using the system and method for receiving detailed reports on the vehicles, drivers and tracking history. For example these figures illustrate reports for the vehicle/driver, e.g., for use in transit.

FIG. 5A illustrates an exemplary user interface used to view the overall driving behavior of all the drivers for a specific time period. The vertical stacked bar graph shows the driving events for each month.

FIG. 5B illustrates an exemplary user interface used to view relative driving behavior scores of the drivers for a specific period and ranks the drivers in the order of best to worst.

FIG. 5C illustrates an exemplary user interface used to view driver score trends and total number of driving events.

FIG. 6 illustrates a data processing system 600 suitable for storing the computer program product and/or executing program code in accordance with an embodiment of the present invention. The data processing system 600 includes a processor 602 coupled to memory elements 604*a-b* through a system bus 606. In other embodiments, the data processing system 600 may include more than one processor and each processor may be coupled directly or indirectly to one or more memory elements through a system bus.

Memory elements 604*a-b* can include local memory employed during actual execution of the program code, bulk storage, and cache memories that provide temporary storage of at least some program code in order to reduce the number of times the code must be retrieved from bulk storage during execution. As shown, input/output or I/O devices 608*a-b* (including, but not limited to, keyboards, displays, pointing devices, etc.) are coupled to the data processing system 600. I/O devices 608*a-b* may be coupled to the data processing system 600 directly or indirectly through intervening I/O controllers (not shown).

In FIG. 6, a network adapter 610 is coupled to the data processing system 602 to enable data processing system 602 to become coupled to other data processing systems or remote printers or storage devices through communication link 612. Communication link 612 can be a private or public network. Modems, cable modems, and Ethernet cards are just a few of the currently available types of network adapters.

Embodiments of the process described herein can take the form of an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

Any theory, mechanism of operation, proof, or finding stated herein is meant to further enhance understanding of the present invention and is not intended to make the present invention in any way dependent upon such theory, mechanism of operation, proof, or finding. It should be understood that while the use of the words "preferable", "preferably" or "preferred" in the description above indicates that the feature so described may be more desirable, it nonetheless may not be necessary and embodiments lacking the same may be contemplated as within the scope of the invention, that scope being defined by the claims that follow. In addition, it should be understood that while the use of words indicating a sequence of events such as "first" and "then" shows that some actions may happen before or after other actions, embodiments that perform actions in a different or additional sequence should be contemplated as within the scope of the invention as defined by the claims that follow.

As used herein, the term "communication" is understood to include various methods of connecting any type of computing or communications devices, servers, clusters of servers, using wired and/or wireless communications networks or cellular communication networks to enable processing and storage of signals and information, and where these services may be accessed by applications available through a number of different hardware and software systems, such as but not limited to a web browser terminal, mobile application (i.e., app) or similar, and regardless of whether the primary software and data is located on the communicating device or are stored on servers or locations apart from the devices.

As used herein the terms "device", "appliance", "terminal", "remote device", "wireless asset", etc. are intended to be inclusive, interchangeable, and/or synonymous with one another and other similar communication-based equipment for purposes of the present invention, even though one will recognize that functionally each may have unique characteristics, functions and/or operations which may be specific to its individual capabilities and/or deployment.

Similarly, it is envisioned by the present invention that the term "wireless network" includes networks using one or more communication architectures or methods, including but not limited to: Code division multiple access (CDMA), Global System for Mobile Communications (GSM) ("GSM" is a trademark of the GSM Association), Universal Mobile Telecommunications System (UMTS), Long Term Evolution (LTE), 4G LTE, 5G, wireless local area network (WIFI) or Bluetooth and Ethernet.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A computer implemented method for providing job status information for at least one IoT device comprising:
   receiving location information of the at least one IoT device;
   receiving job assignment information for the at least one IoT device, wherein the job assignment information for the at least one IoT device comprises start location of route for a job, destination location for the route for the job, one or more pick-up and drop-off points, vehicle assigned to job, driver assigned to job, expected start time, expected end time and customer information;
   evaluating the location information and correlating the location information with job assignment information to determine the job status for the at least one IoT device based on a specified condition, wherein the job status information for the at least one IoT device comprises any of: job not started, job in progress, or job completed; and
   providing a visual representation of the determined job status.

2. The computer-implemented method of claim 1, wherein the location information of at least one mobile device comprises latitude and longitude of the at least one IoT device.

3. The computer-implemented method of claim 2, wherein the location information of at least one mobile device further comprises any one or more of: start location of route for a job, destination location for the route for the job, time of the day for the travel, day of the week for the travel, duration of the travel, distance covered during the travel, one or more location points on the route for the job.

4. The computer-implemented method of claim 1, wherein the customer information for the job assignment further includes any one or more of name of the customer and address of the customer.

5. The computer-implemented method of claim 1, wherein evaluating the location information to determine the job status for the at least one IoT device comprises comparing location of the IoT device to any one or more of: start location of route for the job, destination location for the route for the job, one or more pick-up and drop-off points, location point along the route for the job, vehicle assigned to job, driver assigned to job, expected start time, expected end time and customer information.

6. The computer-implemented method of claim 1, wherein determining the job status for the at least one IoT device based on the specified condition further comprises determining if the location of the vehicle is within a radius of proximity from any one or more of: start location of route for the job, destination location for the route for the job, one or more pick-up and drop-off points, location point along the route for the job.

7. A system for providing job status information for at least one IoT device, the system comprising at least one IoT device, a data processing system and a user interface,
wherein the data processing system further comprises:
a storage database, wherein the storage database receives location information of the at least one IoT device and job assignment information for the at least one IoT device, wherein the job assignment information for the at least one IoT device comprises start location of route for a job, destination location for the route for the job, one or more pick-up and drop-off points, vehicle assigned to job, driver assigned to job, expected start time, expected end time and customer information;
an analytics engine, wherein the analytics engine evaluates the location information and correlates the location information with job assignment information to determine the job status for the at least one IoT device based on a specified condition, wherein the job status information for the at least one IoT device comprises any of: job not started, job in progress, or job completed; and
wherein the user interface provides a visual representation of the determined job status.

8. The system of claim 7, wherein the location information of at least one mobile device comprises latitude and longitude of the at least one IoT device.

9. The system of claim 8, wherein the location information of at least one mobile device further comprises any one or more of: start location of route for a job, destination location for the route for the job, time of the day for the travel, day of the week for the travel, duration of the travel, distance covered during the travel, one or more location points on the route for the job.

10. The system of claim 7, wherein the customer information for the job assignment further includes any one or more of name of the customer and address of the customer.

11. The system of claim 7, wherein the analytics engine evaluates the location information to determine the job status for the at least one IoT device by comparing location of the IoT device to any one or more of: start location of route for the job, destination location for the route for the job, one or more pick-up and drop-off points, location point along the route for the job, vehicle assigned to job, driver assigned to job, expected start time, expected end time and customer information.

12. The system of claim 7, wherein the analytics engine determines the job status for the at least one IoT device based on the specified condition by determining if the location of the vehicle is within a radius of proximity from any one or more of: start location of route for the job, destination location for the route for the job, one or more pick-up and drop-off points, location point along the route for the job.

13. A non-transitory computer-readable medium having executable instructions stored therein that, when executed, cause one or more processors corresponding to a system having a database and a user interface to perform operations comprising:
receiving location information of the at least one IoT device;
receiving job assignment information for the at least one IoT device, wherein the job assignment information for the at least one IoT device comprises start location of route for a job, destination location for the route for the job, one or more pick-up and drop-off points, vehicle assigned to job, driver assigned to job, expected start time, expected end time and customer information;
evaluating the location information and correlating the location information with job assignment information to determine the job status for the at least one IoT device based on a specified condition, wherein the job status information for the at least one IoT device comprises any of: job not started, job in progress, or job completed; and
providing a visual representation of the determined job status.

14. The non-transitory computer-readable medium of claim 13, wherein the location information of at least one mobile device comprises latitude and longitude of the at least one IoT device.

15. The non-transitory computer-readable medium of claim 14, wherein the location information of at least one mobile device further comprises any one or more of: start location of route for a job, destination location for the route for the job, time of the day for the travel, day of the week for the travel, duration of the travel, distance covered during the travel, one or more location points on the route for the job.

16. The non-transitory computer-readable medium of claim 13, wherein the customer information for the job assignment further includes any one or more of name of the customer and address of the customer.

17. The non-transitory computer-readable medium of claim 13, wherein evaluating the location information to determine the job status for the at least one IoT device further comprises instructions for comparing location of the IoT device to any one or more of: start location of route for the job, destination location for the route for the job, one or more pick-up and drop-off points, location point along the route for the job, vehicle assigned to job, driver assigned to job, expected start time, expected end time and customer information.

18. The non-transitory computer-readable medium of claim 13, wherein determining the job status for the at least one IoT device based on the specified condition further comprises instructions for determining if the location of the vehicle is within a radius of proximity from any one or more of: start location of route for the job, destination location for the route for the job, one or more pick-up and drop-off points, location point along the route for the job.

* * * * *